United States Patent
Allen et al.

(10) Patent No.: US 9,574,924 B2
(45) Date of Patent: Feb. 21, 2017

(54) METER HAVING BANDED SHROUD

(75) Inventors: Charles Robert Allen, Houston, TX (US); Randeep Singh Grewal, Houston, TX (US)

(73) Assignee: Daniel Measurement and Control, Inc., Houston, TX (US)

(*) Notice: Subject to any disclaimer, the term of this patent is extended or adjusted under 35 U.S.C. 154(b) by 414 days.

(21) Appl. No.: 13/598,835

(22) Filed: Aug. 30, 2012

(65) Prior Publication Data

US 2013/0180340 A1 Jul. 18, 2013

Related U.S. Application Data

(60) Provisional application No. 61/585,968, filed on Jan. 12, 2012.

(51) Int. Cl.
| | | |
|---|---|---|
| *G01F 1/20* | (2006.01) | |
| *G01F 15/00* | (2006.01) | |
| *G01F 1/66* | (2006.01) | |

(52) U.S. Cl.
CPC ............. *G01F 15/007* (2013.01); *G01F 1/20* (2013.01); *G01F 1/667* (2013.01); *Y10T 29/49826* (2015.01)

(58) Field of Classification Search
CPC ..................................................... G01F 15/007
See application file for complete search history.

(56) References Cited

U.S. PATENT DOCUMENTS

| | | | |
|---|---|---|---|
| 4,235,101 A | * | 11/1980 | Stadelmann ............... 73/114.63 |
| 4,308,754 A | | 1/1982 | Pedersen et al. |
| 5,191,793 A | | 3/1993 | Drexel et al. |
| 5,218,873 A | * | 6/1993 | Lang ..................... G01F 1/8413 |
| | | | 73/861.357 |
| 5,736,647 A | | 4/1998 | Matsubara et al. |
| 5,763,774 A | | 6/1998 | Ha et al. |
| 6,080,934 A | | 6/2000 | Schmidt et al. |
| 6,501,067 B2 | | 12/2002 | Jones et al. |
| 6,644,130 B2 | | 11/2003 | Imai et al. |
| 6,782,150 B2 | | 8/2004 | Davis et al. |
| 6,789,432 B2 | | 9/2004 | Guazzoni et al. |
| 6,895,823 B1 | | 5/2005 | Herrmann et al. |
| 6,895,825 B1 | | 5/2005 | Barkhoudarian |
| 7,293,457 B2 | | 11/2007 | Uramachi et al. |

(Continued)

FOREIGN PATENT DOCUMENTS

| | | |
|---|---|---|
| CN | 101688799 A | 3/2010 |
| CN | 203024809 U | 6/2013 |

(Continued)

OTHER PUBLICATIONS

Chinese Office Action dated Feb. 26, 2013; Chinese Application No. 201220591409.1 (1 p.).

(Continued)

*Primary Examiner* — Robert Huber
*Assistant Examiner* — Herbert K Roberts
(74) *Attorney, Agent, or Firm* — Conley Rose, P.C.

(57) ABSTRACT

A flow meter is disclosed having a meter body that is enveloped by a shroud having a compliant band disposed at least partially about the meter body. The shroud protects transducers and transducer cables. The shroud forms a chamber between the shroud and meter body, and includes a releasable portion to allow access into the chamber.

27 Claims, 18 Drawing Sheets

(56) References Cited

U.S. PATENT DOCUMENTS

| | | | |
|---|---|---|---|
| 7,367,239 B2* | 5/2008 | Engel | G01L 9/0001 |
| | | | 73/861.18 |
| 7,383,741 B2 | 6/2008 | Fukano et al. | |
| 7,397,168 B2 | 7/2008 | Straub, Jr. et al. | |
| 7,469,586 B2 | 12/2008 | Wild et al. | |
| 7,500,402 B2 | 3/2009 | Pors et al. | |
| 7,628,081 B1 | 12/2009 | Feller | |
| 7,634,950 B2 | 12/2009 | Rhodes | |
| 7,779,710 B2* | 8/2010 | Allen | G01F 1/662 |
| | | | 73/866.5 |
| 7,861,602 B2 | 1/2011 | Matsubara | |
| 7,963,162 B2 | 6/2011 | Muziol et al. | |
| 7,963,176 B2 | 6/2011 | Pors et al. | |
| 2003/0051559 A1* | 3/2003 | Ehrlich | G01F 1/662 |
| | | | 73/861.28 |
| 2003/0084732 A1 | 5/2003 | Ehrlich et al. | |
| 2003/0172743 A1 | 9/2003 | Ao et al. | |
| 2007/0035211 A1 | 2/2007 | Straub, Jr. et al. | |
| 2009/0049927 A1 | 2/2009 | Spivak et al. | |
| 2009/0078499 A1* | 3/2009 | Sikes et al. | 181/256 |
| 2010/0111467 A1 | 5/2010 | Vidal et al. | |
| 2010/0242590 A1* | 9/2010 | Day | 73/204.22 |
| 2010/0326202 A1 | 12/2010 | Hisada et al. | |
| 2011/0162460 A1 | 7/2011 | Allen et al. | |
| 2011/0162461 A1 | 7/2011 | Allen | |
| 2011/0162462 A1 | 7/2011 | Allen | |
| 2011/0162463 A1 | 7/2011 | Allen | |
| 2013/0180340 A1 | 7/2013 | Allen et al. | |

FOREIGN PATENT DOCUMENTS

| | | | |
|---|---|---|---|
| DE | 4439399 A1 | 5/1996 | |
| DE | 29621964 U1 | 3/1997 | |
| DE | 19713526 A1 | 10/1998 | |
| EP | 0890826 A1 | 1/1999 | |
| EP | 0852702 A1 | 11/2001 | |
| EP | 0972171 B1 | 10/2003 | |
| EP | 1350077 B1 | 11/2006 | |
| EP | 2187183 A1 | 5/2010 | |
| EP | 1344026 B1 | 6/2011 | |
| FR | 2150630 A1 | 4/1973 | |
| GB | 2203546 A | 10/1988 | |
| GB | 2429061 A | 2/2007 | |
| KR | 20-0324696 Y1 | 8/2003 | |
| WO | 97/12208 A2 | 4/1997 | |
| WO | 02/44656 A2 | 6/2002 | |
| WO | 02/44663 A1 | 6/2002 | |
| WO | 2007/020375 A1 | 2/2007 | |
| WO | 2008/157114 A2 | 12/2008 | |
| WO | 2009/023528 A1 | 2/2009 | |
| WO | 2009/034946 A1 | 3/2009 | |
| WO | 2010/002432 A1 | 1/2010 | |
| WO | 2011/084912 A2 | 7/2011 | |

OTHER PUBLICATIONS

Wolf, Dieter, et al., "Optimisation of Biogas Production by Infrared Spectroscopy Based Process Control," International Gas Union Research Conference 2011, Germany (14 p.).

SICK AG Brochure: "Gas Flow Measuring Devices, Ultrasonic Gas Flow Meter, FLOWSIC600 (FLOWSIC600 Bio)," Waldkirch, Germany, www.sick.com (accessed Mar. 19, 2014) (5 p.).

Canadian Notice of Approval for SICK Engineering GmbH's "Ultrasonic Flow Meter" dated Nov. 16, 2007 (31 p.).

PCT/US2012/052986 Search Report and Written Opinion dated Nov. 28, 2012 (8 p.).

Figure 1: FlowSic 400, 2010 (1 p.).

PCT/US2011/020289 International Search Report and Written Opinion Dated Aug. 18, 2011 (9 p.).

PCT/US2011/020106 International Search Report and Written Opinion Dated Aug. 18, 2011 (9 p.).

U.S. Notice of Allowance Dated Jan. 19, 2012; U.S. Appl. No. 12/683,036 (10 p.).

"TotalSonic 900 Software Manual," ABB, Inc., Totalflow Products, Bartlesville, Oklahoma, www.totalflowsupport.com/Manuals-PDF/Totalsonic%20software.PDF, (52 p).

"Ultrasonic Gas Flow Meter Operates Under High Pressure," ThomasNet News, Jul. 27, 2004, http://news.thomasnet.com/fullstory/Ultrasonic-Gas-Flow-Meter-operates-under-high-pressure-453897, accessed Nov. 28, 2012, (1 p.).

Chinese Office Action Dated Dec. 5, 2013; Chinese Application No. 201180008134.2 (7 p.).

European Search Report Dated May 29, 2013; European Application No. 11732047.3 (7 p.).

Response to European Search Report Dated May 29, 2013; European Application No. 11732047.3; Response Dated Dec. 19, 2013 (16 p.).

Russian Decision to Grant Dated Dec. 17, 2013; Russian Application No. 2012129946 (23 p.).

Chinese Office Action dated Dec. 2, 2014; Chinese Application No. 201210448056.4 (5 p.).

English Translation of Chinese Office Action dated Dec. 2, 2014; Chinese Application No. 201210448056.4 (7 p.).

Canadian Office Action dated Oct. 20, 2015, for Canadian Application No. 2,861,762 (5 p.).

European Search Report dated Nov. 4, 2015, for European Application No. 12864708.8 (8 p.).

* cited by examiner

METER HAVING BANDED SHROUD

CROSS-REFERENCE TO RELATED APPLICATIONS

This application claims benefit of U.S. provisional patent application Ser. No. 61/585,968, filed Jan. 12, 2012, and entitled "Meter Having Banded Shroud."

STATEMENT REGARDING FEDERALLY SPONSORED RESEARCH OR DEVELOPMENT

Not applicable.

BACKGROUND

Field of the Disclosure

This disclosure relates generally to liquid and gas flow meters. More particularly, it relates to an apparatus and system for protecting cables extending from ultrasonic flow meters.

Background Information

Hydrocarbons, in both liquid and gas phases, are transported from place to place via pipelines. It is desirable to accurately know the amount of fluid flowing in the stream, particularly when the fluid is changing hands, an event referred to as "custody transfer." Even where custody transfer is not taking place, measurement accuracy is desirable, and in these situations, ultrasonic flow meters are commonly used.

An ultrasonic flow meter typically includes two or more transducer assemblies, each secured inside of a dedicated port in the body of the flow meter. The body of the flow meter may also be referred to as a spool piece. To seal the fluid within the flow meter, a connector is secured over the exterior end of each transducer port in the spool piece. Thus, the spool piece and end connectors create a sealed housing and pressure boundary that contains the fluid that is flowing through the meter.

To measure fluid flow through the meter, a pair of transducer assemblies is positioned such that the piezoelectric elements of the transducers are adjacent to the inner surface of the spool piece, and such that each transducer of the pair faces the other of the pair that is positioned on opposite sides of the fluid-carrying bore of the spool piece. The transducer assemblies transmit and receive electric signals back-and-forth across the fluid stream.

Each transducer assembly is coupled to a cable that extends through the end connector to the exterior of the spool piece, and to a remote location, typically an electronics enclosure mounted on or adjacent to the spool piece. The electric signals created by the piezoelectric element of the particular transducer assembly is carried by the cable to an acquisition circuit board housed within the electronics enclosure, where the signal may be processed and subsequently used to determine the fluid flow rate through the meter.

Typically, the transducer cables are run to the electronics enclosure along the outer surface of the spool piece, where they remain constantly exposed to weather and sunlight, which can degrade the cables' insulation. Left exposed, the cables are also susceptible to being tampered with and becoming damaged by falling debris, livestock contacting or eating the cables, and vandals. Further, left unprotected, the cables and transducers are exposed to possible damage during shipping and installation. Consequently, it is common to employ robust and thus relatively expensive cables in an attempt to resist damage and degradation.

Some attempts have been made to manufacture meter bodies having internal cable passageways that are formed in the walls of the meter body to at least partially cover the cables to provide some degree of protection. In some such products, the ends of the transducer assemblies and portions of the cables are nevertheless still exposed and thus susceptible to damage. Further, although the cables may be partially covered, access to the transducer assemblies in such products is not prevented, such that the transducer assemblies may be tampered with, with no indication that such tampering has taken place. Tampering with transducers and cable connections may disable the meter completely, or alter the meter's performance in accurately measuring the fluid flow.

BRIEF DESCRIPTION OF THE DRAWINGS

For a detailed description of the disclosed exemplary embodiments of the disclosure, reference will now be made to the accompanying drawings in which.

DETAILED DESCRIPTION OF THE DISCLOSED EMBODIMENTS

Figure 1:
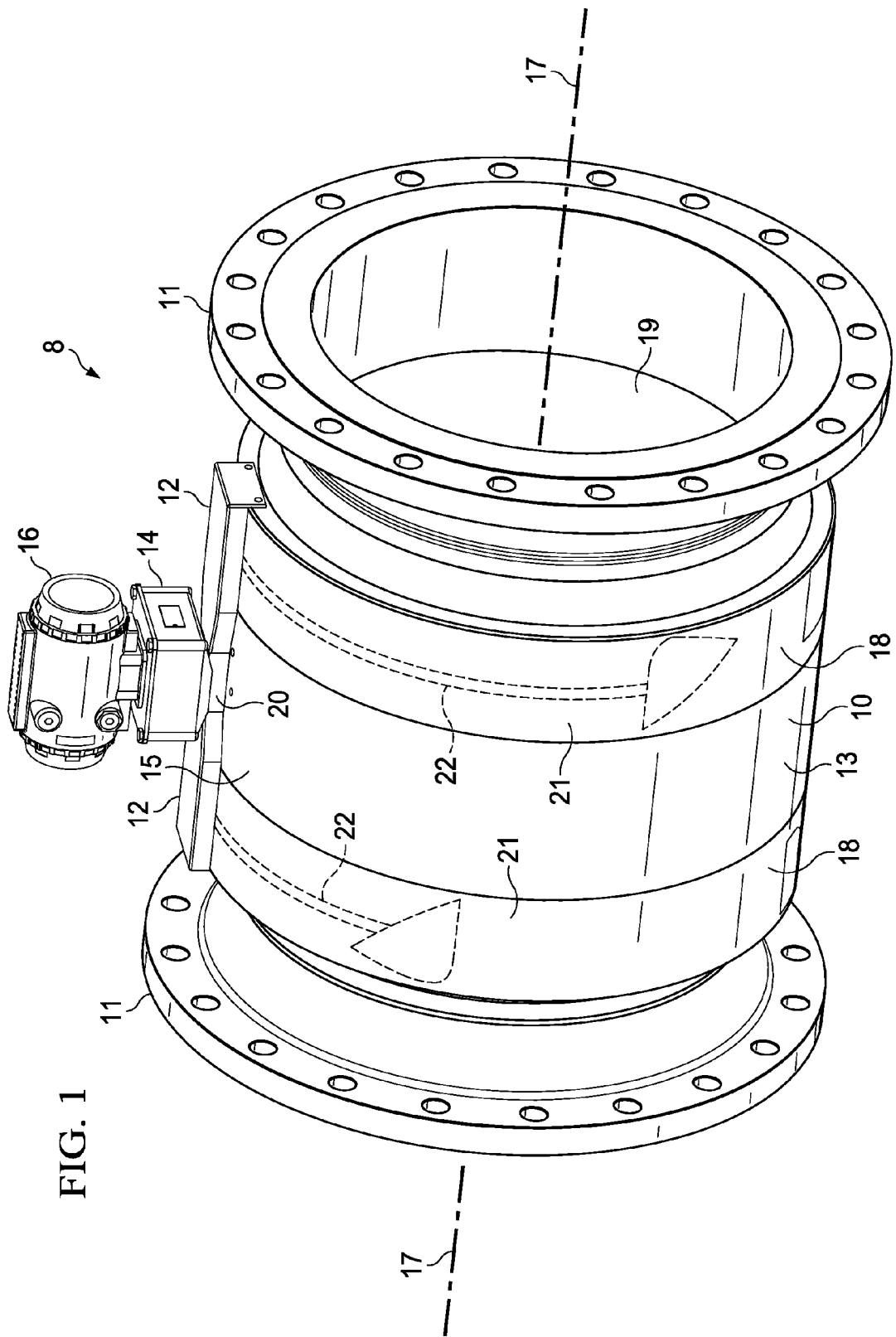
FIG. 1 is a perspective view of a first embodiment of an ultrasonic flow meter including a completely assembled banded shroud made in accordance with principles described herein.

The following description is exemplary of embodiments of the disclosure. These embodiments are not to be interpreted or otherwise used as limiting the scope of the disclosure, including the claims. One skilled in the art will understand that the following description has broad application, and the discussion of any embodiment is meant only to be exemplary of that embodiment, and is not intended to suggest in any way that the scope of the disclosure, including the claims, is limited to that embodiment.

The drawing figures are not necessarily to scale. Certain features and components disclosed herein may be shown exaggerated in scale or in somewhat schematic form, and some details of conventional elements may not be shown in the interest of clarity and conciseness.

The terms "including" and "comprising" are used herein, including in the claims, in an open-ended fashion, and thus should be interpreted to mean "including, but not limited to . . . ." Also, the term "couple" or "couples" is intended to mean either an indirect or direct connection. Thus, if a first component couples or is coupled to a second component, the connection between the components may be through a direct engagement of the two components, or through an indirect connection that is accomplished via other intermediate components, devices and/or connections. If the connection transfers electrical power or signals, the coupling may be through wires or through one or more modes of wireless electromagnetic transmission, for example, radio frequency, microwave, optical, or another mode.

In some of the figures, one or more components or aspects of a component may be not displayed or may not have reference numerals identifying the features or components that are identified elsewhere in order to improve clarity and conciseness of the figure.

In addition, as used herein, the terms "axial" and "axially" generally mean along or parallel to a given axis (e.g., central axis of a body or a port), while the terms "radial" and "radially" generally mean perpendicular to the axis. For instance, an axial distance refers to a distance measured along or parallel to the axis, and a radial distance means a distance measured perpendicular to the axis.

First Embodiment of a Meter Having Banded Shroud

Figure 2:
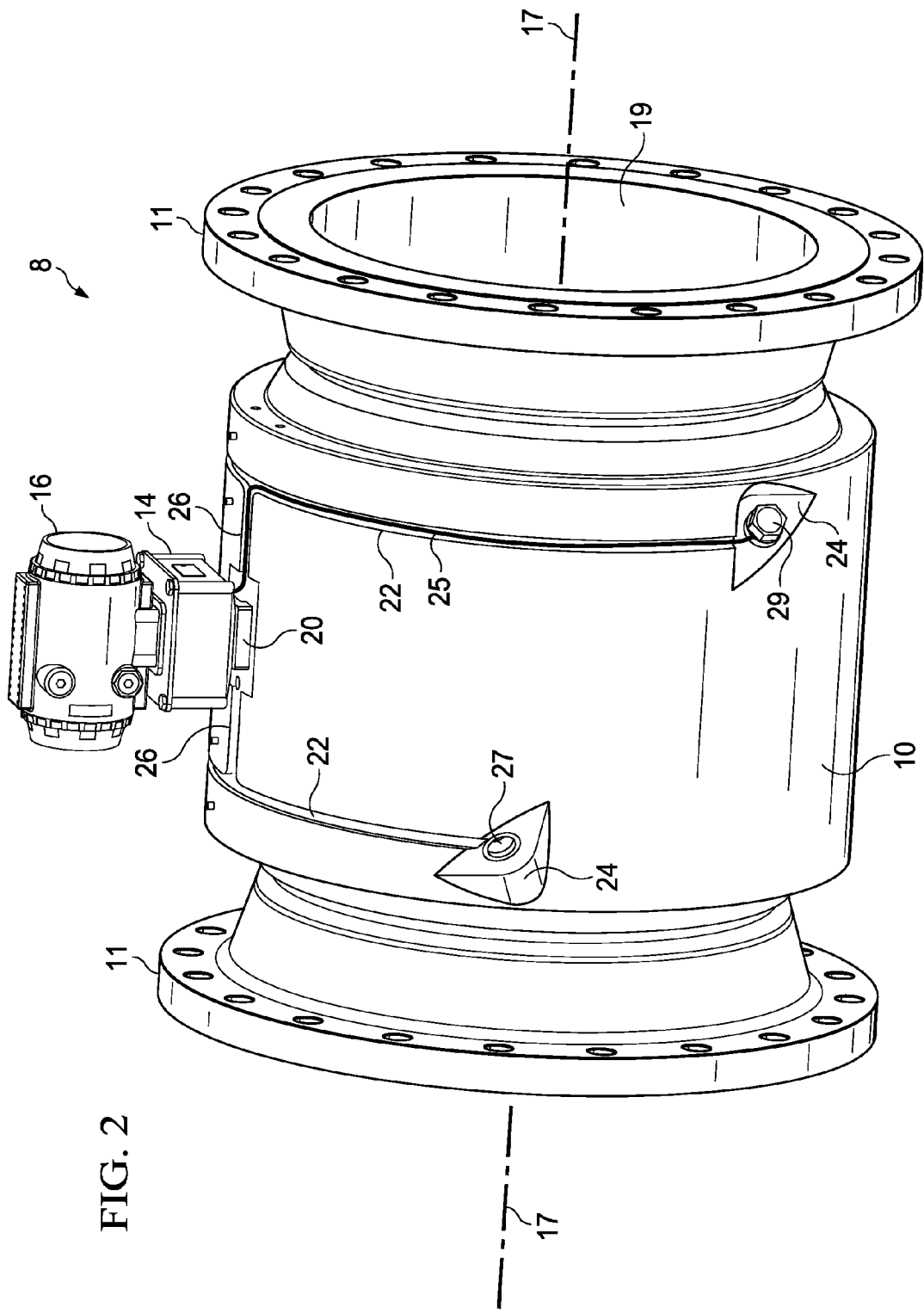
FIG. 2 is a perspective view of the meter shown in FIG. 1, without the cable shroud in place.

Referring to FIGS. 1 and 2, an exemplary embodiment of an ultrasonic flow meter 8 made in accordance with principles disclosed herein includes a meter body or spool piece 10 having longitudinal axis 17 and suitable for placement between aligned sections of a pipeline, a lower and upper electronic housings 14, 16, a plurality of transducers 29 coupled to meter body 10, transducer cables 25 extending from transducers 29 to lower electronics housing 14, and a cable shroud 21 completely covering the cables 25 and transducers 29. Cable shroud 21 includes a pair of covering bands 18, a central shroud 20 positioned on the top of meter body 10 and below lower electronics housing 14, and a pair of end shroud assemblies 12 positioned on either side of the central shroud 20.

Referring now to FIG. 1, meter body 10 includes a pair of flanges 11 that are adapted for connection to corresponding flanges (not shown) on the pipeline sections. Body 10 is shown to generally include a central tubular section 13 having a generally cylindrical outer surface 15 extending between flanges 11. Body 10 further includes a longitudinal axis 17 and a central flow passage 19 through which fluid flows can be measured. Typically, body 10 is forged, and then machined to its final form; however, it may be formed by any suitable manufacturing technique.

Referring to FIG. 2, the flow meter 8 further includes transducer assemblies 29 that are electrically coupled to circuitry within lower electronics housing 14 via cables 25. For brevity, as used herein, "transducer assembly" may be referenced herein simply as "transducer." Pockets 24 in the outer surface of the body 10 include threaded ports 27, each receiving a transducer 29. Each port extends between central flow passage 19 and the pocket 24 in cylindrical outer surface 15 of the body 10.

Body 10 further includes circumferential channels 22 which extend from pockets 24 to the top of the tubular section 13. The outer surface 15 of the meter body 10 further includes a set of longitudinally-directed channels 26 which intersect the circumferential channels 22 at the top of the meter body 10 and extend to central shroud 20, positioned under the lower electronics housing 14 (described below). Channels 22, 26, band 18, and central shroud 20 form wireways for transducer cables 25 to pass from transducers 29 to electronics housing 14.

Figure 5:
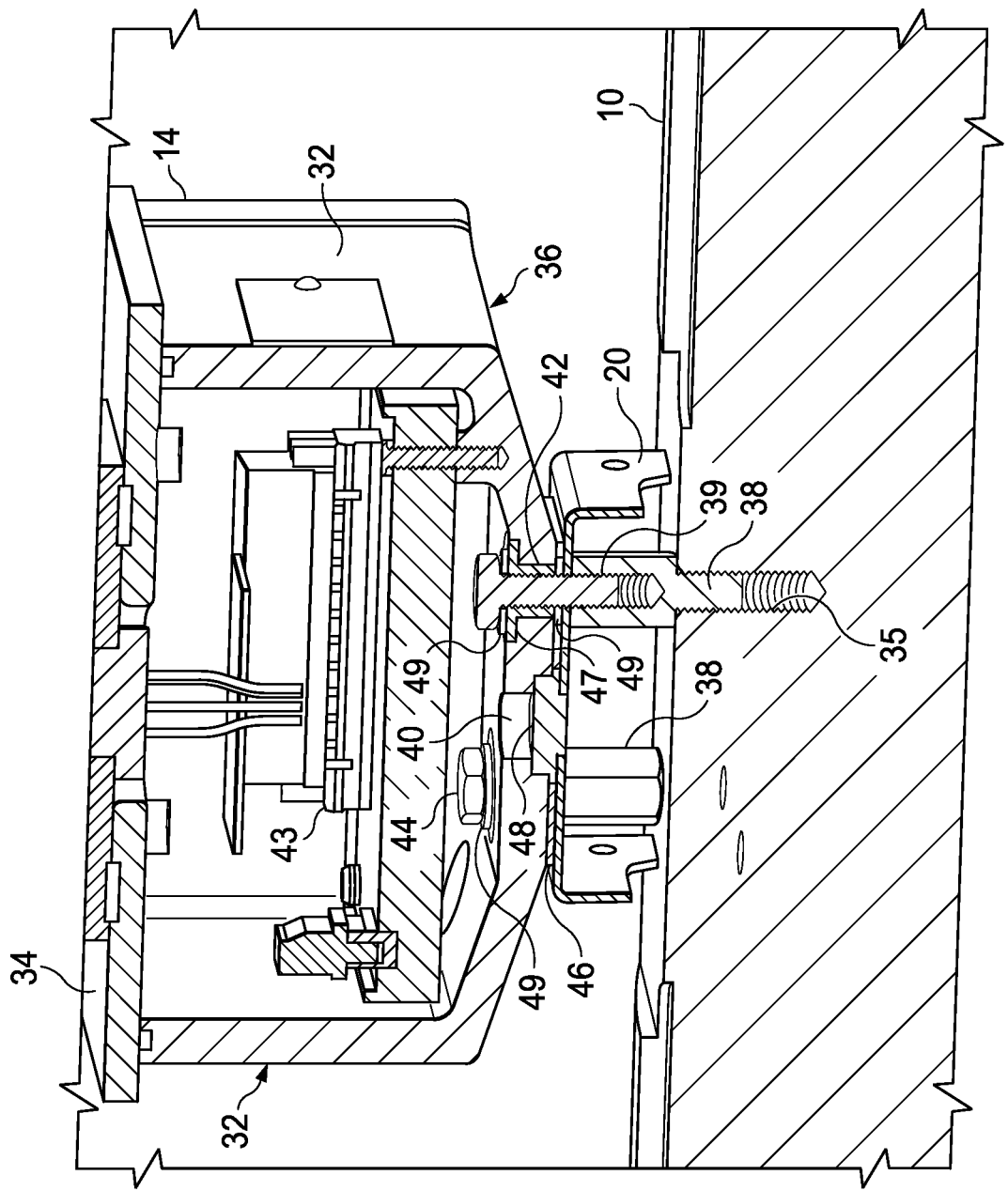
FIG. 5 is a perspective view, partly in cross-section, showing the lower electronics housing coupled to the top of the meter shown in FIG. 1.

As best shown in FIG. 5, the top portion of the tubular section 13 further includes a generally rectangular area which is generally planar and includes three threaded bores 35. Supported within and extending upwardly from bores 35 are three standoffs 38. Standoffs 38 include lower threaded stud portions engaging bores 35 and include upper threaded bores 39 for receiving fasteners 44 (described below) connecting the lower electronics housing 14 to body 10. Bores 35 and standoffs 38 are asymmetrically positioned such that lower electronics housing 14 can be attached to meter body 10 in only one orientation. This helps to ensure that, during installation, the transducers 29 and their respective cables 25 are coupled to the proper terminals or circuit board 43 within lower electronics housing 14.

Referring again to FIG. 2, a transducer 29 is retained within each transducer pocket 24. Each transducer 29 threadably engages a threaded port 27 located in pocket 24 and is sealed to prevent fluid from escaping central flow passage 19. A transducer cable 25 extends between the transducer 29 and the lower electronics housing 14 via circumferential channels 22 and longitudinally-directed channels 26, and electrically couples the transducer elements to electronics that are housed in the lower electronics housing 14. In the embodiment shown, meter 8 employs four transducers 29, and four cables 25 extend within channels 22, 26 and terminate in the lower electronics housing 14.

Figure 3:
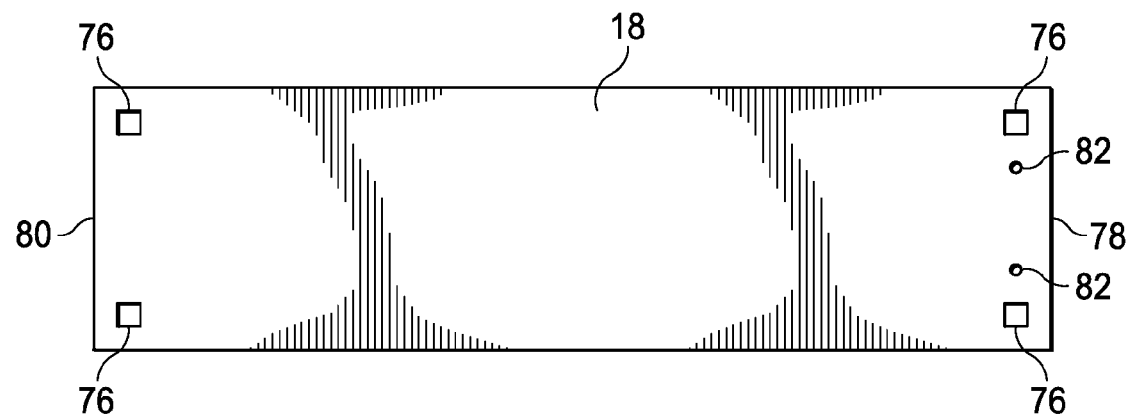
FIG. 3 is a plan view of one of the compliant bands employed in the cable shroud shown in FIG. 1.

As previously described, cable shroud 21 includes a pair of bands 18. As an example, bands 18 may be made of sheet steel or aluminum and, in this embodiment, are of a thickness that permits the bands to be compliant. Referring to FIG. 3, compliant bands 18 include a first end 78 and a second end 80. First end 78 includes a pair of apertures 82 which loosely receive pins 30 (shown in FIG. 7) protruding from the surface of the top of meter body 10 when band 18 is placed around meter body 10 so as to cover circumferential channels 22 and transducer cables 25 that are retained therein. Both the first and second ends 78, 80 of the compliant bands 18 also include a pair of rectangular holes 76 which receive the connecting ends of a worm gear fastener 28 (shown in FIG. 7).

Figure 7:
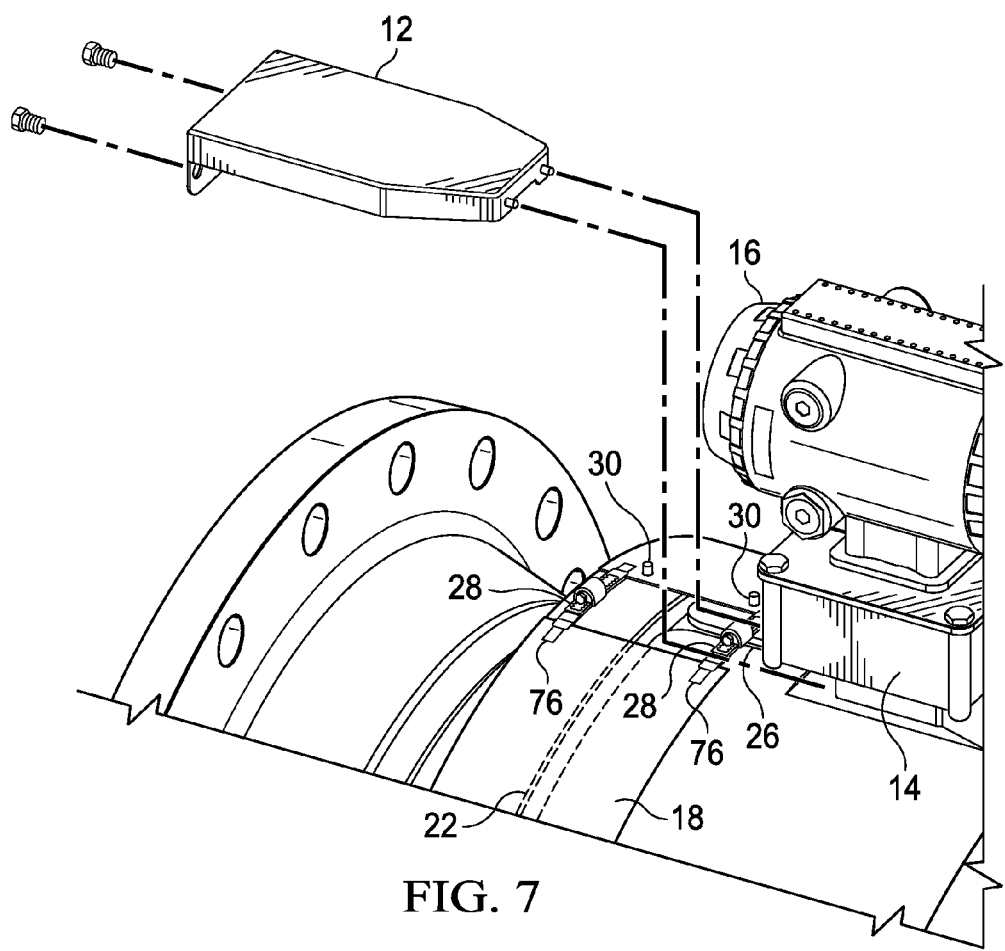
FIG. 7 is a perspective view showing the assembly of the compliant bands and end shroud assembly on the meter shown in FIG. 1.

Referring now to FIG. 7, the compliant bands 18 are placed around the meter body 10 and cover channels 22 such that wireways or chambers are formed between the inner surfaces of compliant bands 18 and the walls of circumferential channels 22 housing transducer cables 25. When compliant bands 18 are placed around the circumference of meter body 10 such that the first and second ends 78, 80 nearly meet at the top of meter body 10, a worm gear fastener 28 is placed between the two ends 78, 80, attached to the corresponding rectangular holes 76, and tightened to secure the bands 18.

Figure 4:
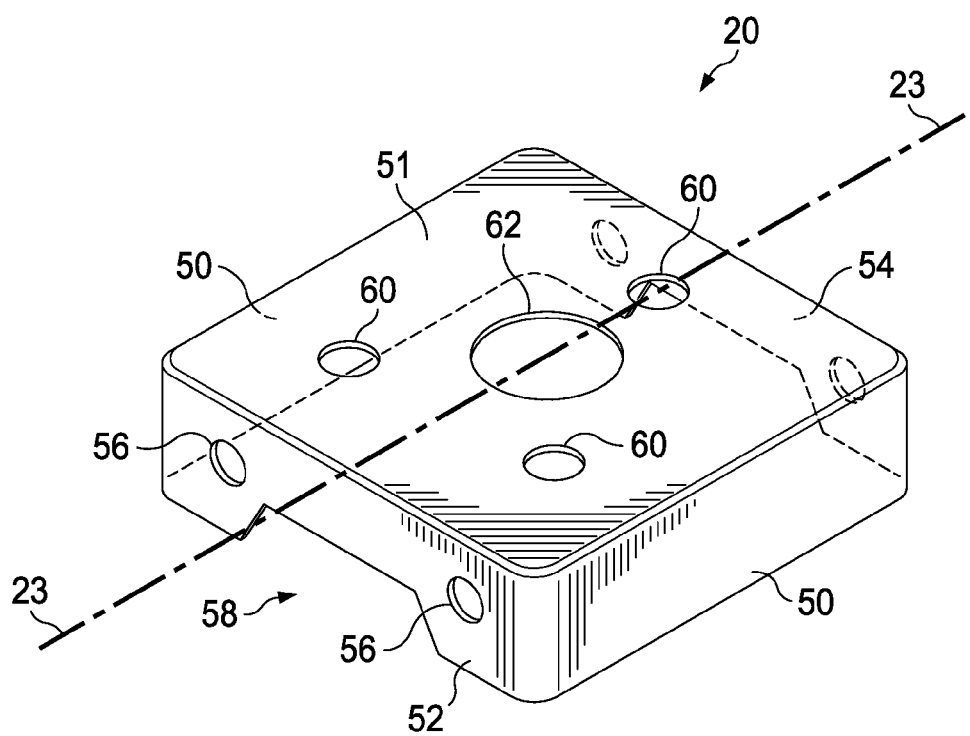
FIG. 4 is a perspective view of the central shroud employed in the cable shroud shown in FIG. 1.

Referring to FIG. 4, central shroud 20 is a box-like structure and includes a longitudinal axis 23, a first end 52 and a second end 54, a top 51, and two lateral sides 50. Top 51 includes an aperture 62 for receiving transducer cables 25, as well as three apertures 60 for receiving fasteners 44 (shown in FIG. 5) for attaching the lower electronics housing 14 to meter body 10. First and second ends 52, 54 are symmetrical to one another and include two apertures 56 to receive pins 70 protruding from the end shroud assemblies 12 (described below), and an elongated notch 58 extending along the bottom to allow access to transducer cables 25 as they extend from longitudinally-directed channels 26 into lower electronics housing 14. Central shroud 20 may be stamped, cut or otherwise formed from a single, unitary sheet of material and then bent to form central shroud. A suitable material for central shroud 20 is sheet steel or aluminum, for example.

Referring to FIG. 5, lower electronics housing 14 includes a bottom 36, sides 32, and a top 34. Upper electronics housing 16 (FIG. 1) is supported by the top of the lower electronic housing 14. The bottom 36 of lower electronics housing 14 is supported atop standoffs 38 on the top of meter body 10. Bottom 36 also includes a first aperture 40 for receiving transducer cables 25, and includes three additional apertures 42 for receiving threaded fasteners 44. Apertures 42 are asymmetrically positioned to mirror the location of the threaded bores 39 in standoffs 38 protruding from the top of meter body 10

Threaded fasteners 44 engage the threaded bores 39 in standoffs 38, standoffs 38 maintaining clearance between meter body 10 and the top of central shroud 20. Retained within lower electronics housing 14 are one or more terminal strips and circuit boards 43, to which transducer cables 25 couple.

It is desirable that lower electronics enclosure 14 be sealed in order to prevent the ingress of moisture, water, and dirt. Accordingly, during assembly, a gasket 46 of rubber or other elastomeric material is disposed between the top of central shroud 20 and the bottom 36 of lower electronics housing 14. Further, an elastomeric, annular cable seal member 48 is provided in aperture 40 and seals between lower electronics housing 14 and entering transducer cables 25. In this embodiment, each of the four transducer cables 25 extends through cable aperture 40 on the top of central shroud 20 and through cable seal member 48.

As best understood with reference to FIG. 5, the tightening of fasteners 44 secures lower electronics housing 14 to meter body 10 with the top of the central shroud 20 and the gasket 46 sandwiched between. The tightening of fasteners 44 compresses gasket 46. To prevent over-compression, each fastener 44 passes through a shoulder washer 47 and through a pair of flat washers 49, one flat washer above and one below the shoulder washer 47. In this embodiment, both the shoulder washer 47 and the flat washers 49 are made of plastic or other non-conducting material. Gasket 46 includes a hole at the location of each flat washer 49, with the diameter of the hole being slightly larger than the diameter of the washer 49. Collectively, shoulder washer 47 and flat washers 49 prevent over-compression of gasket 46 while, at the same time, providing a rigid mounting of lower electronics housing 14 to meter body 10.

The non-conducting flat washers 47 further electrically isolate lower electronics housing 14 from the top of central shroud 20 which, in this embodiment, is made of a conducting sheet metal. Transducer cables 25, once inside central shroud 20, extend to and terminate on the appropriate terminals of circuit boards 43 such that, in a conventional manner, electrical signals generated by transducers 29 and conveyed to circuit boards 43 can be processed by electronics within lower housing 14 or, via further electrical coupling, by electronics housed in upper housing 16.

Figure 6:
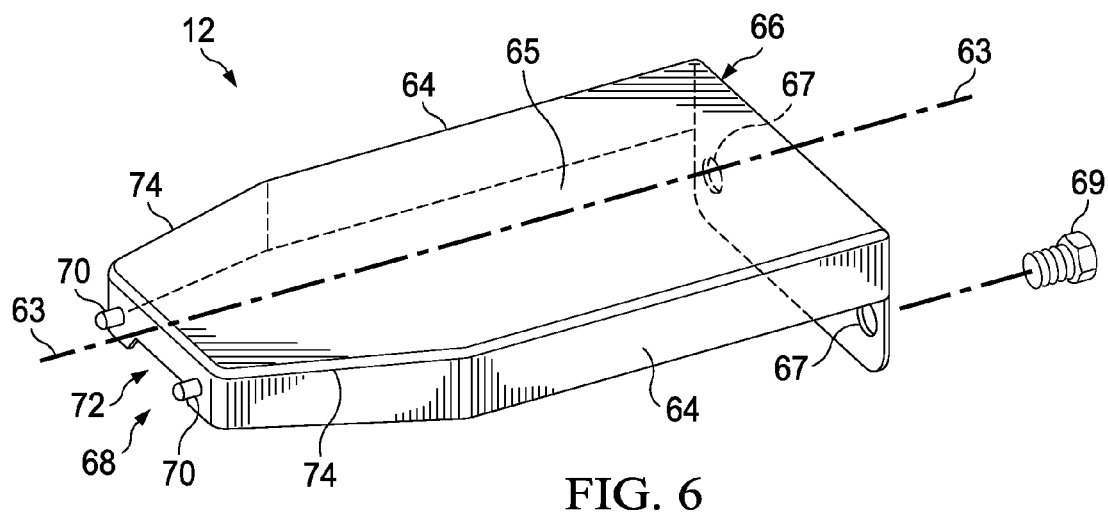
FIG. 6 is a perspective view of the end shroud assembly employed in the cable shroud shown in FIG. 1.

Referring to FIG. 6, the end shroud assemblies 12 include a longitudinal axis 63 extending between an outer wide end 66 and a dog-eared or tapered inner end 68, a top 65, and lateral sides 64. Tapered end 68 includes two protruding pins 70 which correspond to apertures 56 on first and second ends 52, 54 of central shroud 20 (shown in FIG. 4). Inner end 68 also includes an elongated notch 72 which generally corresponds in size and shape to similar notches 58 on the first and second ends 52, 54 of the central shroud 20 (shown in FIG. 4). Wide end 66 includes two apertures 67 for receiving fasteners 69 for attaching each end shroud assembly 12 to meter body 10, as best shown in FIG. 7. Referring again to FIG. 6, each end shroud assembly 12 further includes mitered corners 74 near the tapered ends 68 in order to narrow the width of the assembly 12 such that it corresponds with the width of the central shroud 20. End shroud assembly 12 may be stamped, cut or otherwise formed from a single, unitary sheet of material and then bent to form the end shroud assembly. Exemplary materials suitable for end shroud assemblies 12 include sheet steel or aluminum.

Second Embodiment of a Meter Having Banded Shroud

Figure 8:
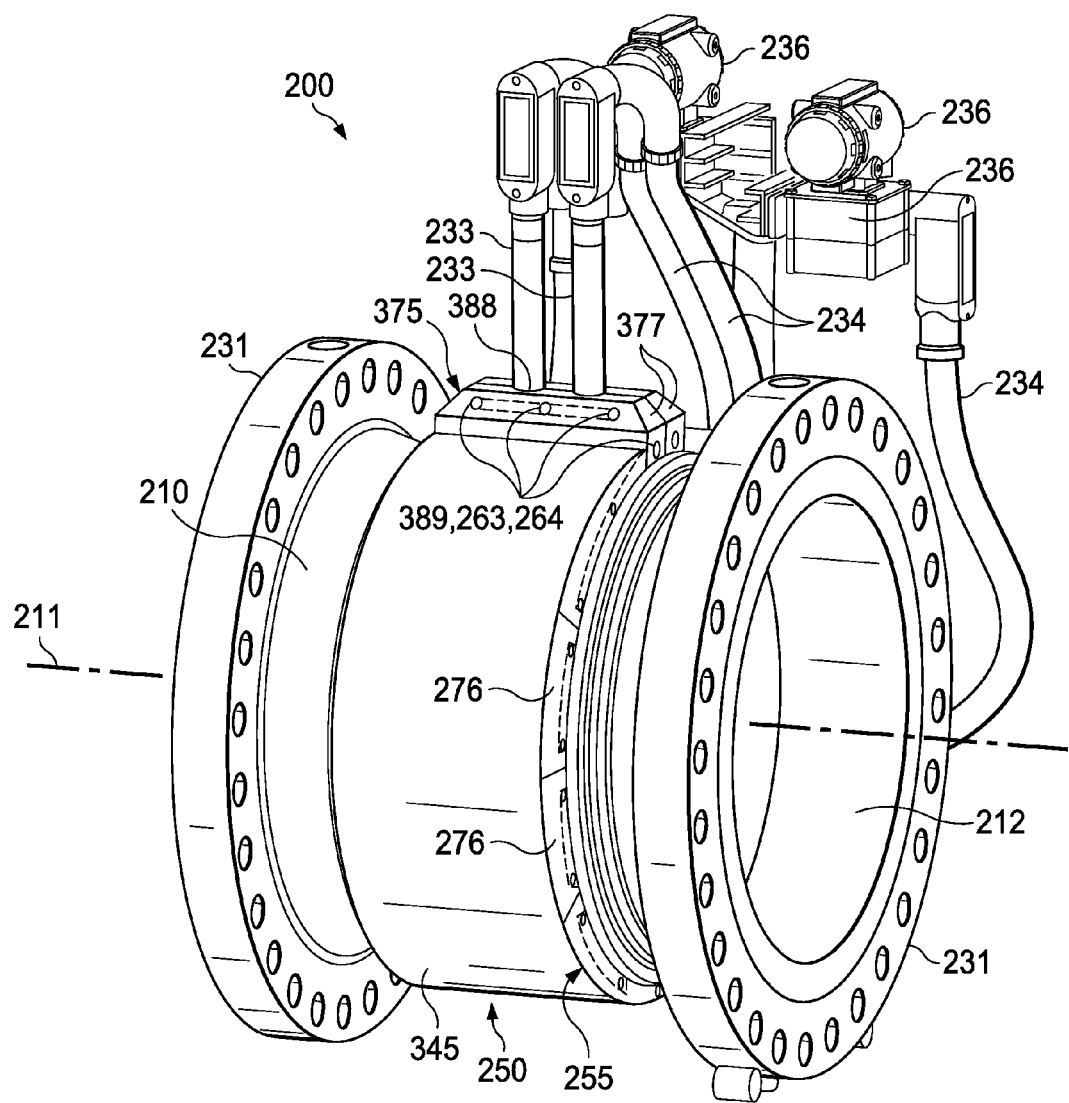
FIG. 8 is a perspective view of a second embodiment of a meter with a banded shroud in accordance with principles described herein.
Figure 9:
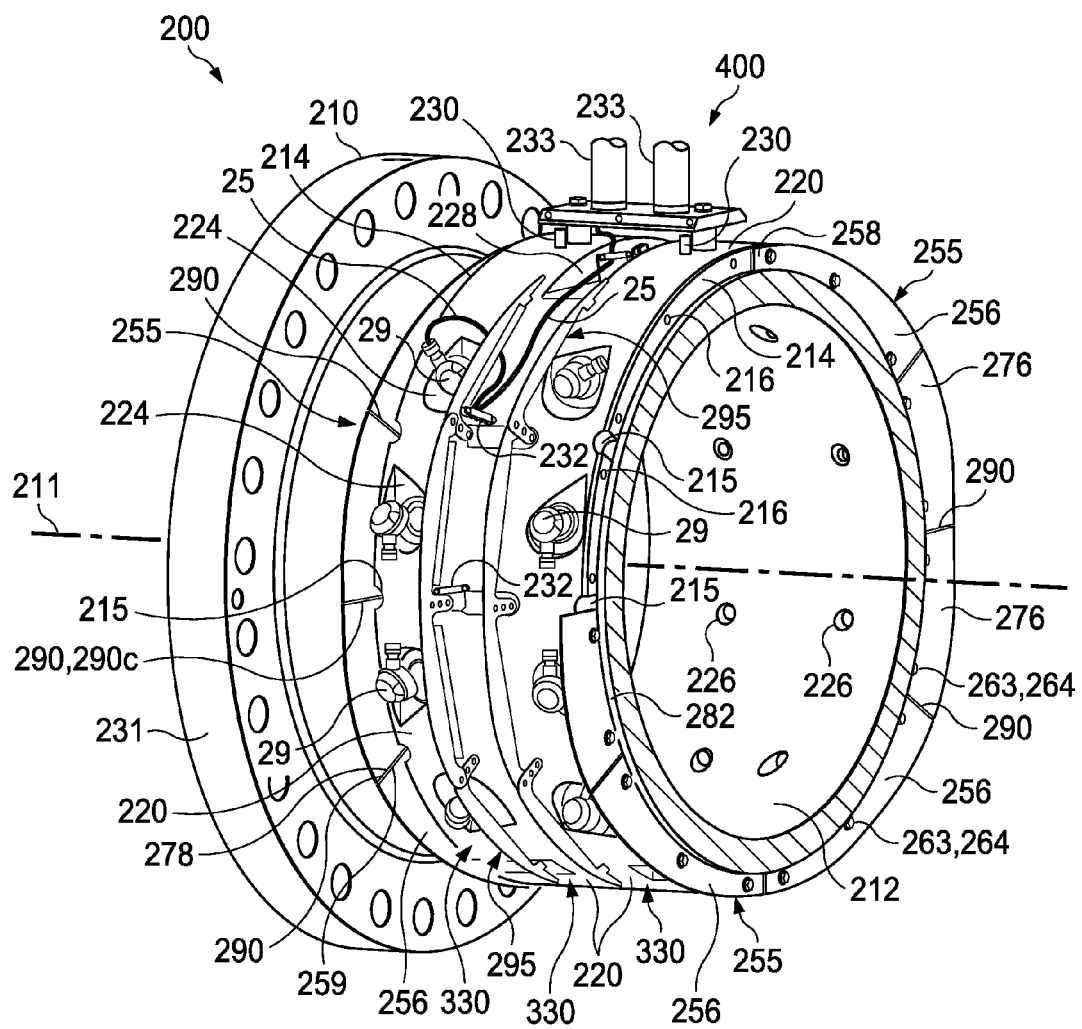
FIG. 9 is a cross-sectional perspective view of the meter of FIG. 8 shown without a portion of the banded shroud in place.

Referring to FIGS. 8 and 9, a second embodiment of a flow meter 200 includes a meter body or spool piece 210 suitable for placement between aligned sections of a pipeline, a banded shroud 250 coupled around meter body 210, one or more transducer assemblies 29, a pair of flanges 231, a junction block 400, and at least one electronics housing 236. Electronics housing 236 is preferably a sealed enclosure and is coupled to meter body 210 by conduit 233 of junction block 400 and by additional conduit 234. In this embodiment, electronics housing 236 is mounted separately from the meter body 210. Conduits 233, 234 may be made of electrically conductive or non-conductive material, and may be rigid or flexible.

Referring now to FIG. 9, meter body 210 includes a generally tubular section with a generally cylindrical outer surface 220, a longitudinal axis 211, and a central flow passage 212 through which the flow of a fluid may be measured. Typically, body 210 is cast or forged and then machined to its final form; however, it may be formed by any suitable manufacturing technique. Each end of meter body 210 is coupled to a flange 231. Flanges 231 are adapted for connection to corresponding flanges (not shown) on pipeline sections.

Meter body 210 also includes two radially extending, annular surfaces 214 axially displaced from one another and located towards the ends of body 210. Annular surfaces 214 encircle body 210. Each surface 214 faces a flange 231, and comprises a plurality of threaded counter bores 216 for mounting banded shroud 250. Disposed at the intersection of annular surfaces 214 and outer surface 220, a series of radially-extending semi-circular recesses 215 are formed to aid with the installation of shroud 250, as described below. Shown at the top of FIG. 9, a recess 228 is formed in outer surface 220 and is generally aligned with the axial mid-point of meter body 210. Recess 228 comprises generally planar base and forms a channel or wireway to receive cables, such as a transducer cable 25.

Figure 10:
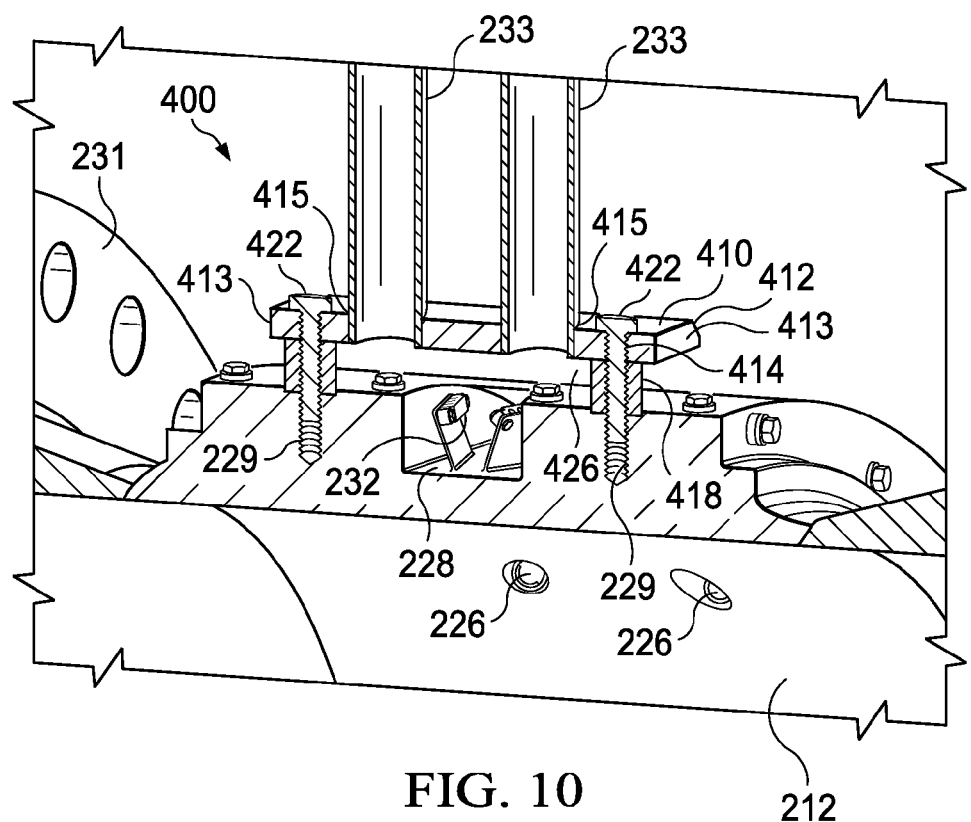
FIG. 10 is a cross-sectional perspective view of the meter of FIG. 8 showing the junction block.
Figure 11:
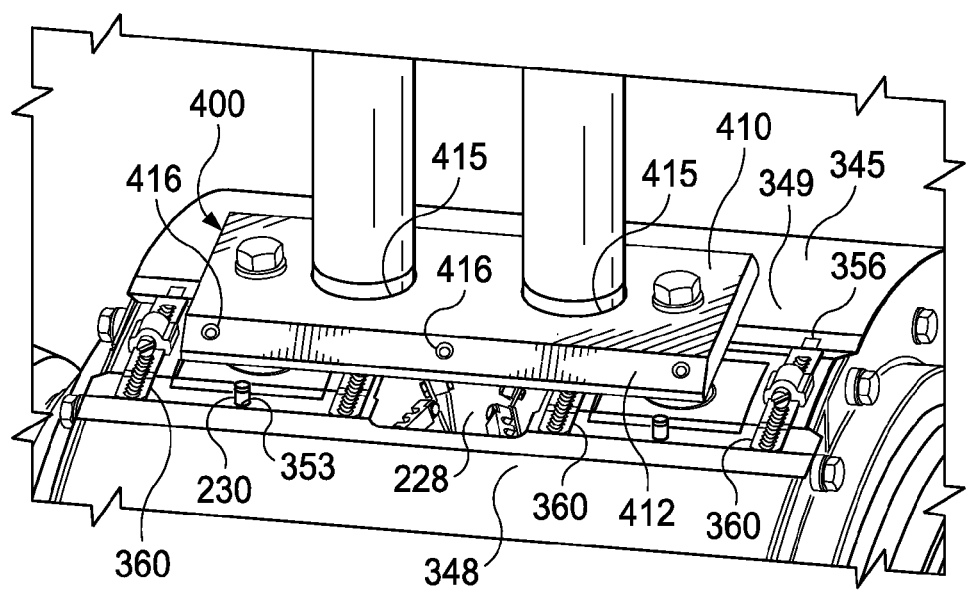
FIG. 11 is a close perspective view of the upper portion of the meter of FIG. 8.

Best seen in FIGS. 10 and 11, junction block 400 is an assembly comprising one or more sections of conduit 233, a plate 410, a plurality of bosses or stand-off elements 418, and a plurality threaded fasteners 422. Plate 410 comprises mitered longitudinal sides 412 generally aligned with longitudinal axis 211, two opposing ends 413, a plurality of through-holes 414, an aperture 415 for each conduit 233, and a plurality of threaded counter bores 416 on sides 412. In this embodiment, junction block 400 includes two through-holes 414, one near each end 413, and two apertures 415 between the through-holes 414. When meter 200 is assembled, each aperture 415 receives and secures a section of conduit 233, which extends primarily away from meter body 210. Stand-off elements 418 include a central through-bore and are generally axially aligned with through-holes 414 and positioned between plate 410 and meter body 210. A threaded fastener 422 extends through each hole 414 and the aligned bore of stand-off 418. Fastener 422 is threadingly received by a threaded counter bore 229 in meter body 210, coupling junction block 400 to meter body 210. With plate 410 separated from outer surface 220 of meter body 210 by stand-off elements 418, a longitudinally-directed channel or wireway 426 is formed under plate 410.

In other embodiments similar to FIG. 10, one or more conduit 233 are disposed directly over recess 228, and plate 410 is mounted to meter body 210 without any stand-off elements 418 and without forming channel 426 between plate 410 and body 210. In other embodiments, one or more machine washers may be used, and possibly stacked, to form a supportive feature equivalent to stand-off elements 418. In other embodiments, longitudinal sides 412 are not mitered, and one or more features of shroud 250 are modified to compensate. Other such modifications are possible and within the scope of the disclosure.

In the embodiment of FIG. 9, the outer surface 220 of meter body 210 includes a plurality of transducer assemblies 29 disposed in a plurality of recesses or transducer pockets 224. Each pocket 224 connects to a threaded port 226, extending between central flow passage 212 and outer surface 220. Each port 226 is configured to receive threadingly and to hold tightly a transducer assembly 29 without loss of fluid. Some aspect of one or more of the transducer assemblies 29 may extend into central flow passage 212. Transducer 29 is electrically coupled to circuitry within an electronics housing 236 by cable 25, which passes through conduits 233, 234. The path of cable 25 will be explained in more detail subsequently. A cable 25 may consist of one or more segments that are interconnected by one or more cable connector blocks 232, also known as terminal blocks, that are coupled to meter body 210. The circuits in an electronics housing 236 may be configured to do any or all of these tasks: receive, amplify, adjust, and transmit data from one or more transducers 29. Transducers 29 may include a variety of transducer types, including thermocouple pressure transducer, and ultrasonic flow sensor elements, for example. Multiple pairs of transducers 29 may be disposed in various pockets 224 and ports 226.

Referring again to FIGS. 8 and 9, banded shroud 250 comprises a plurality of end-support assemblies 255, a plurality of central-support assemblies 295, at least one covering band 345, and at least one central shroud 375, which covers junction block 400. The embodiment of FIGS. 8 and 9 comprise four end-support assemblies 255 and four central-support assemblies 295; although, fewer or more assemblies 255 and fewer or more assemblies 295 may also be employed. Each of a pair of symmetric shroud end-support assemblies 255 couples to and covers an annular surface 214. In this embodiment, assemblies 255 are structures having the shape and appearance of radially-extending walls, each configured to extend generally half-way around annular surface 214. As will be described later, the height of the walls (assemblies 255) varies around the circumference of meter body 210.

Figure 12:
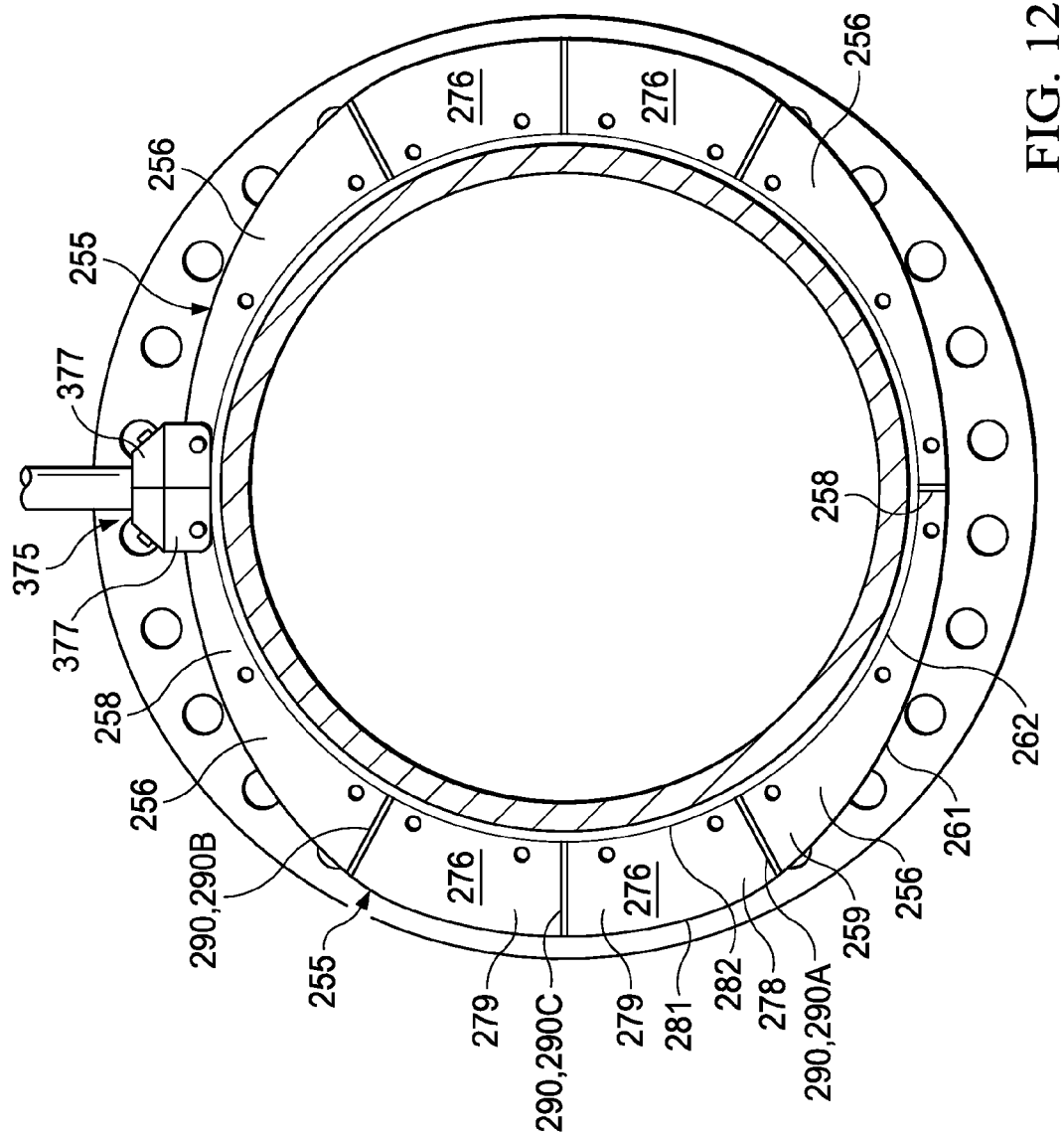
FIG. 12 is a cross-sectional end view of the meter of FIG. 8 with shroud end support assemblies clearly visible.

As best seen in FIG. 12, a shroud end-support assembly 255 comprises four coupled plates: two end plates 256 and two central plates 276. End plate 256 comprises a shorter first end 258, a taller second end 259, an outer edge 261 that follows a generally elliptical path, and an inner edge 262 that follows a generally circular arc. First end 258 is generally flat. In contrast, second end 259 includes a perpendicular bend, which forms a flange. The two separate end plates 256 of an assembly 255 are essentially mirror copies of one another.

Central plate 276 comprises a first end 278, a taller second end 279, an outer edge 281 that follows a generally circular arc, and an inner edge 282 that also follows a generally circular arc. The center point of arch 282 need not be radially aligned with the center point of outer edge 281. The height of first end 278 generally matches the height of second end 259 on end plate 256. Both ends 278, 279 are bent to form a flange. The two central plates 276 of an assembly 255 are essentially mirror copies of one another.

Referring to the left side of FIG. 12, to form an end-support assembly 255, the taller end 259 of a first end plate 256 is coupled to the first end 278 of a first central plate 276, forming a flanged connection 290 at the location where the plates 256, 276 meet. This first flanged connection is identified as connection 290A in FIG. 12. A second end plate 256, which is a mirrored copy of the first, is similarly coupled to a second central plate 276, which is a mirrored copy of the other central plate 276, forming a second flanged connection 290B. The two sets of paired plates 256, 276 couple together with the two central plates 276 contacting along second ends 279. The coupling of second ends 279 forms a third flanged connection 290C. The result is an end-support assembly 255 generally shaped like half of an annulus. Assembly 255 is coupled to an annular surface 214 by fasteners 263 and optional lock-washers 264. Fasteners 263 extend through apertures or holes in plates 256, 276 near inner edges 262, 282, respectively, and threadingly engage with threaded counter bores 216 near surface 214. Flanged connections 290 extend into semi-circular recesses 215 on meter body 210. Flanged connections 290 strengthen assembly 255 against externally applied radial and axial force components that might otherwise cause buckling. At the shorter first ends 258, the generally elliptical outer edges 261 of end plates 256 are generally flush with outer surface 220. Outer edges 261 extend radially further and further beyond outer surface 220 as outer edge 261 approaches second end 259. Past flanged the connection 290A, 290B that joins a second end 259 with first end 278 of a central plate 276, circular outer edge 281 continues the outward reach, extending still further beyond outer surface 220, until reaching the vicinity of second end 279 and flanged connection 290C, which couples the two central plates 276 of end-support assembly 255.

Figure 13:
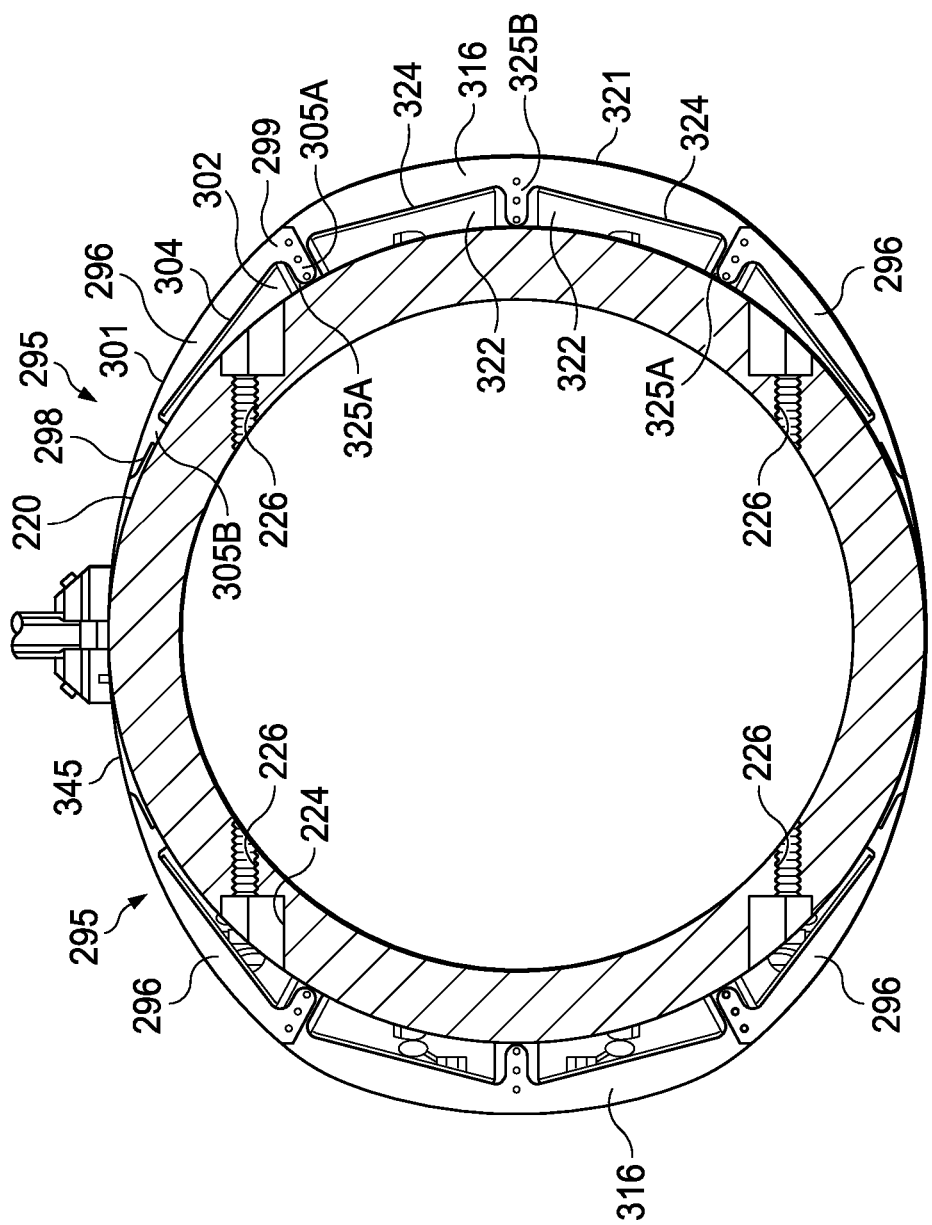
FIG. 13 is a cross-sectional end view of the meter of FIG. 8 with shroud central support assemblies clearly visible.

As best seen in FIG. 13, a shroud central-support assembly 295 comprises three coupled plates, which are two end members 296 and a central member 316, extending radially from meter body outer surface 220. End member 296 is substantially flat and comprises a shorter first end 298, a taller second end 299, an outer edge 301 that follows a generally elliptical path, a support rib 304, a leg 305B near first end 298, and a leg 305A near second end 299. First end 298 tapers to nearly a point. Support rib 304 extends from the vicinity of leg 305A to the vicinity of leg 305B and is generally aligned tangent to a point on edge 301 but is displaced from edge 301. Rib 304 may be formed by bending a portion of end member 296 perpendicular to the remaining portion of member 296, developing a bottom notch 302 between legs 305A, 305B. The two end members 296 of an assembly 295 are essentially mirror copies of one another. Central member 316 is substantially flat and comprises an outer edge 321 extending along a generally circular arc, two support ribs 324, legs 325A near the two ends of member 316, and a leg 325B near the middle of member 316. Outer edge 321 is generally defined by a path formed from two separate circular arcs that connect above middle leg 325B. Each support rib 324 extends from the vicinity of a leg 325A to the vicinity of leg 325B and is generally aligned tangent to a point on edge 321 but is displaced from edge 321. Rib 324 may be formed by bending a portion of central member 316 perpendicular to the remaining portion of member 316, developing a bottom notch 322 between the pair of legs 325A, 325B. Thus, there are two bottom notches 322 in central member 316.

Referring still to FIG. 13, to form a central-support assembly 295, the taller end 299 of a first end member 296 is coupled to one end of central member 316 to form a connection in which a leg 305A and a leg 325A overlap and are fastened together. A second end member 296, which is a mirror copy of the first, couples to the other end of central member 316 forming a similar connection. The result is a central-support assembly 295 generally shaped like a portion of an annulus. A mounting bracket 327 (best seen in FIG. 14) couples to the joined legs 305A, 325A, and another bracket 327 couples to the middle leg 325B. Legs 305A, 305B, 325A, 325B of assembly 295 couple to outer surface 220 using fasteners similar to fasteners 263, the fasteners threadingly engaging counter bores (not shown) in surface 220. Cable connector blocks 232 couples to legs 305A, 305B, 325A, 325B or brackets 327. Brackets 327 are configured to strengthen assembly 295 against externally applied radial and axial forces that might otherwise cause buckling. At the shorter first ends 298 of end members 296, the generally elliptical outer edges 301 are relatively close to outer surface 220. Outer edges 301 extend radially further and further beyond outer surface 220 as outer edge 301 approaches taller second end 299. Past the connection of paired legs 305A, 325A, circular outer edge 321 on central member 316 continues the outward reach, extending still further beyond outer surface 220, finally reaching the vicinity of middle leg 325B. Central-support assemblies 295 are thus generally described as structures having the shape and appearance of radially-extending walls or ribs, each configured to couple at least a portion of the circumference to outer surface 220 of meter body 210.

Figure 14:
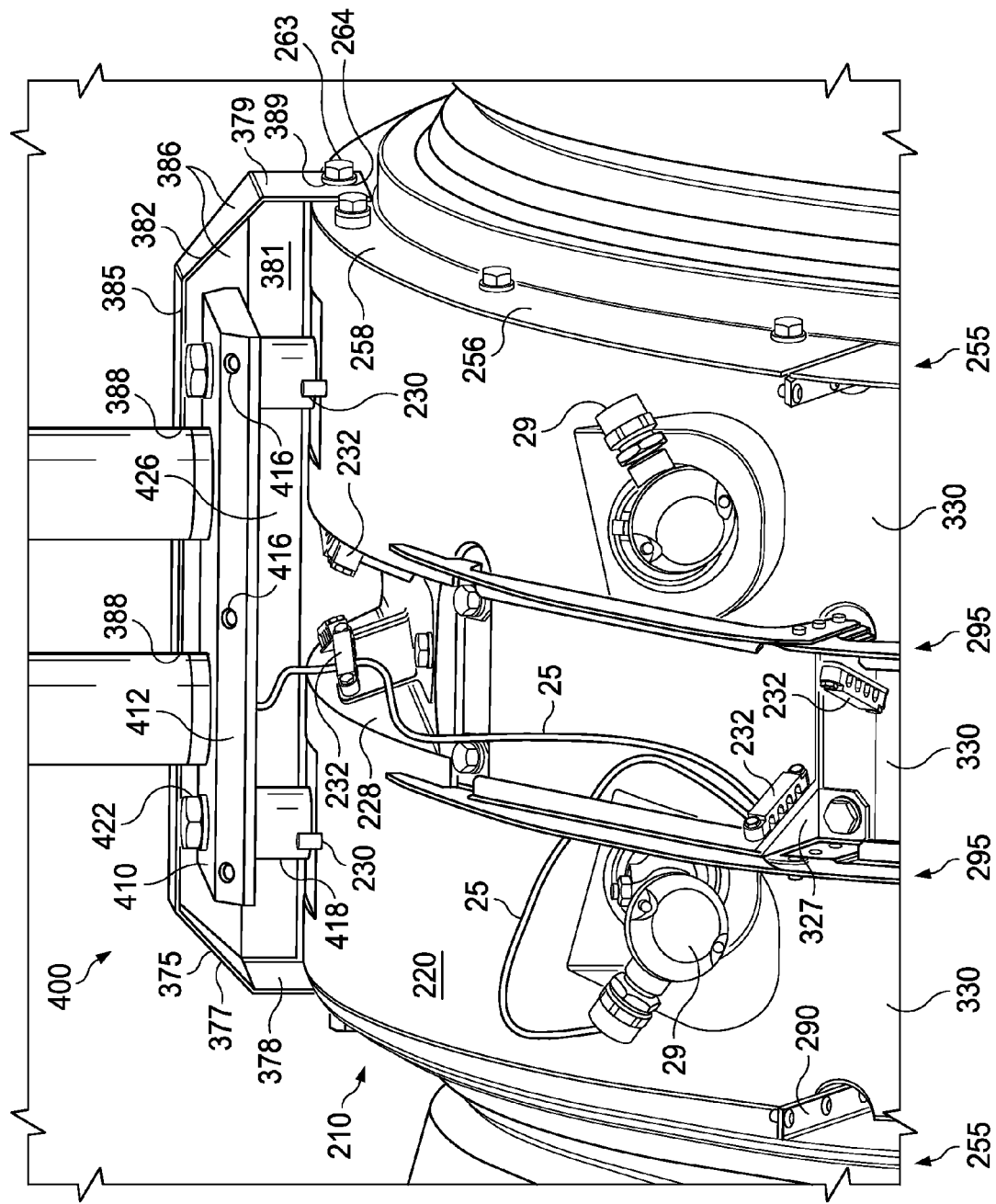
FIG. 14 is a close perspective view of the upper portion of the meter of FIG. 8 showing the routing of a cable from a transducer.

As best seen in FIG. 14, a plurality of circumferentially oriented channels 330 are formed between shroud end-support assemblies 255 coupled to annular surfaces 214 and shroud central-support assemblies 295 coupled to outer surface 220 on meter body 210. In the embodiment shown in FIG. 14, three circumferential channels 330 are formed on one half of meter body 210. Although not shown in FIG. 14, another three channels 330 are formed on the opposite half of meter body 210. In other embodiments, assemblies 255, 295 may be coupled to only one side of meter body 210 such that channels 330 are formed on only that one side of meter body 210.

Figure 23:
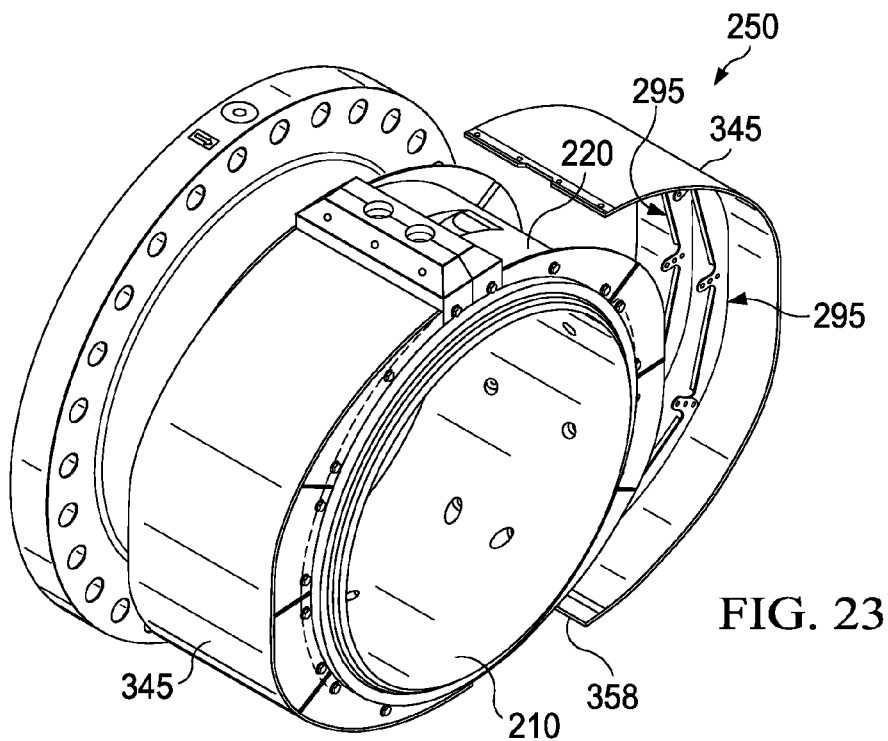
FIG. 23 is a perspective view of the meter of FIG. 8 shown with another embodiment of the banded shroud.
Figure 24:
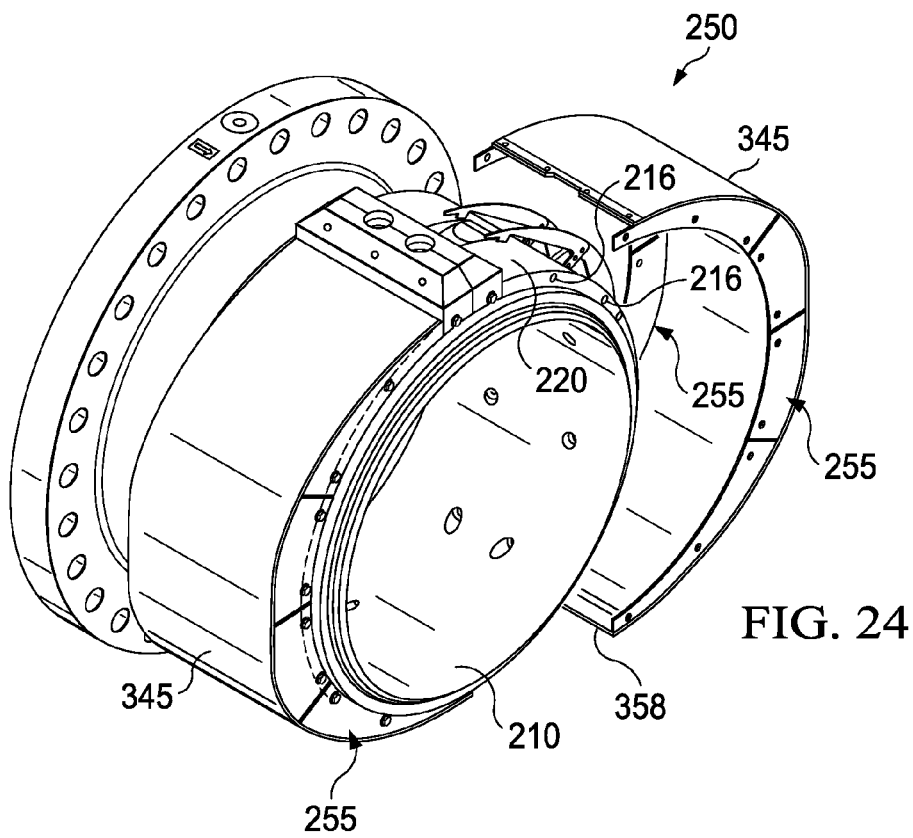
FIG. 24 is a perspective view of the meter of FIG. 8 shown with yet another embodiment of the banded shroud.

Referring now to FIG. 23, in some embodiments, one or more central-support assemblies 295 are not coupled to outer surface 220 of meter body 210 but instead are coupled to a covering band 345 of band shroud 250. Referring to FIG. 24, in some embodiments, one or both end-support assemblies 255 are coupled to a covering band 345 of band shroud 250. In some embodiments, one or more central-support assemblies 295 and one or both end-support assemblies 255 are coupled to a covering band 345 of band shroud 250.

Figure 15:
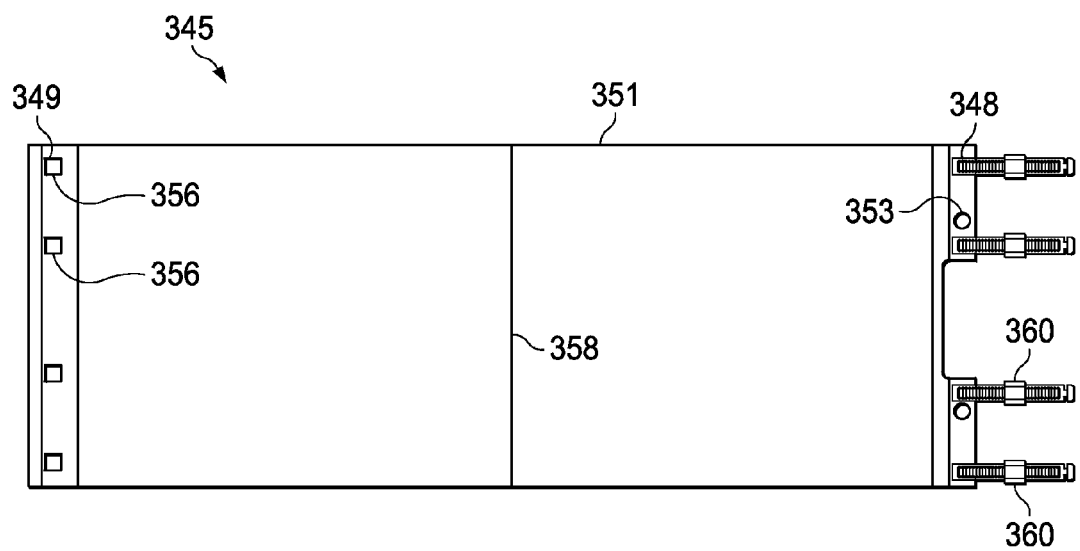
FIG. 15 is a top view of the compliant band shown on the meter of FIG. 8.
Figure 16:
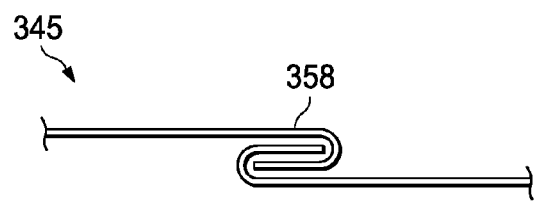
FIG. 16 is a side view of a hem seam of the compliant band of FIG. 15.

Referring now to FIGS. 11 and 15, band 345 is complaint and includes a first end 348, a second end 349, and two outer edges 351. FIG. 15 shows a top view of how compliant band 345 would appear if it were laid flat. The first end 348 includes a pair of apertures 353 which loosely receive pins 230 on meter body 210 near junction block 400 when band 345 is releasably coupled to and disposed around at least a portion of the circumference of meter body 210. A plurality of worm gear fasteners 360 couple to the ends of band 345. The first ends of worm gear fasteners 360 couple to first end 348. The coupling of the features 360, 348 may be accomplished by welding, by riveting, or by another suitable means. Second end 349 of band 345 includes a plurality of rectangular holes 356, which releasably receives and hold the tabs formed at the second ends of worm gear fasteners 360. Thus the first end 348 of band 345 is releasably attached to the second end 349 of band 345 by means of fastener 360. In this embodiment, compliant band 345 is formed in two parts, which are configured to coupled or decoupled, selectively, by means of their interlocking ends 358. Interlocking ends 358 join to form a hem seam, which is shown in FIG. 16. Interlocking ends 358 facilitate the installation and removal of band 345 around meter body 210.

As best explained in reference to FIGS. 8 and 9, compliant band 345 is disposed around at least a portion of the general perimeter or circumference of shroud end-support assemblies 255 and shroud central-support assemblies 295 while, at the same time, being circumferentially disposed around meter body 210. In the disclosed embodiment, compliant band 345 is disposed about a majority of the circumference of meter body 210; although, other embodiments may have a shorter or longer band 345 that covers a lesser or greater portion of meter body 210 and in some embodiments, the entire circumference of body 210. When so positioned, compliant band 345 covers circumferential channels 330 such that chambers are formed therein and serve as wireways for transducer cables 25. In this arrangement, first and second ends 348, 349 of band 345 nearly meet at a location adjacent or under junction block 400, as is best shown in FIG. 11. Band 345 is held in position by pins 230 passing through apertures 353 and by worm gear fasteners 360 coupling first and second ends 348, 349. Band 345 also covers a portion of the channel formed by recess 228.

As illustrated in FIGS. 8 and 14, when installed on meter body 210, central shroud 375 covers junction block 400, the ends 348, 349 of compliant band 345, recess 228, and channel 426. Central shroud 375 comprises two half-shell members 377. Each half-shell member 377 comprises a first end 378, a second end 379, a longitudinal side 381, an open longitudinal edge 382, a top 385, mitered faces 386, and a semi-circular notch 388 for each conduit 233. In the embodiment of FIGS. 8 and 14, member 377 has two semi-circular notches 388 in top 385. Each end 378, 379 and longitudinal side 381 is adjoined to top 385 by a mitered face 386. Mitered faces 386 extend until they merge together at 385, and the one or more notches 388 are formed in mitered faces 386.

Referring to FIG. 8, a plurality of apertures 389 penetrate the mitered face 386 that is adjacent to longitudinal side 381 to couple member 377 to threaded counter bores 416 on junction block 400 using fasteners 263 and lock-washers 264. Additional apertures 389 are formed in end 378, 379 to couple member 377 to threaded counter bores 216 on annular surface 214 using fasteners 263 and lock-washers 264. With central shroud 375 installed as described, a chamber or wireway is formed by recess 228 and the underside of central shroud 375. An adjoining chamber or wireway is formed by the underside of central shroud 375 and longitudinally-directed channel 426 under plate 410.

The chambers formed from circumferential channels 330, recess 228, and longitudinally-directed channel 426 house transducers 29, cables 25, and may house other instruments, insulation, and communication components or devices. Junction block 400 is adapted to pass one or more cables 25 from within one or more of these chambers to a location outside shroud 250. In the example of FIG. 14, a cable 25 connected to transducers 29 in a channel 330 passes through a bottom notch 302 in central-support assembly 295 and enters a centrally located channel 330. Cable 25 extends up to recess 228 and channel 426 and continues by passing through conduit 233, 234 and entering into an electronics housing 236 where cable 25 is coupled to a circuit board or a cable connector block. Cable 25 may be a series of cable lengths with intermediate ends coupled to one or more connector blocks 232, or cable 25 may be a single length of cable.

A Third Embodiment of a Meter Having Banded Shroud

Figure 17:
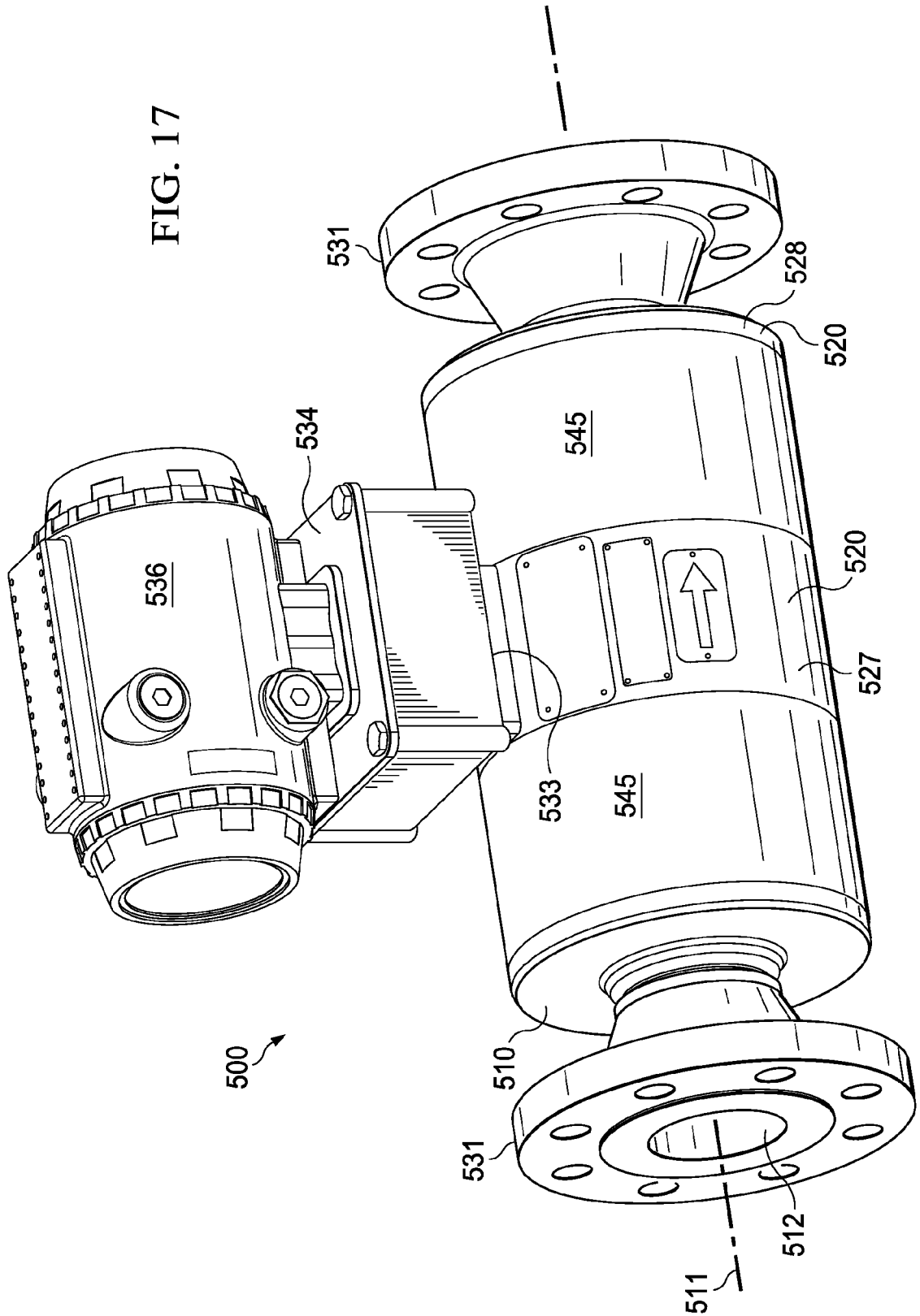
FIG. 17 is a perspective view of a third embodiment of a meter with a banded shroud in accordance with principles described herein.

Referring to FIG. 17, a third embodiment of a flow meter 500 consistent with the present disclosure includes a meter body or spool piece 510 suitable for placement between aligned sections of a pipeline, one or more compliant bands 545 configured to couple around meter body 510, one or more transducer assemblies 540 (FIG. 19), a pair of flanges 531, a junction block 533, and one or more electronics housings. In the example of FIG. 17, two compliant bands 545 are disposed around meter body 510, and a lower electronics housing 534 and an upper electronics housing 536 are coupled to meter body 510 by junction block 533.

Figure 18:
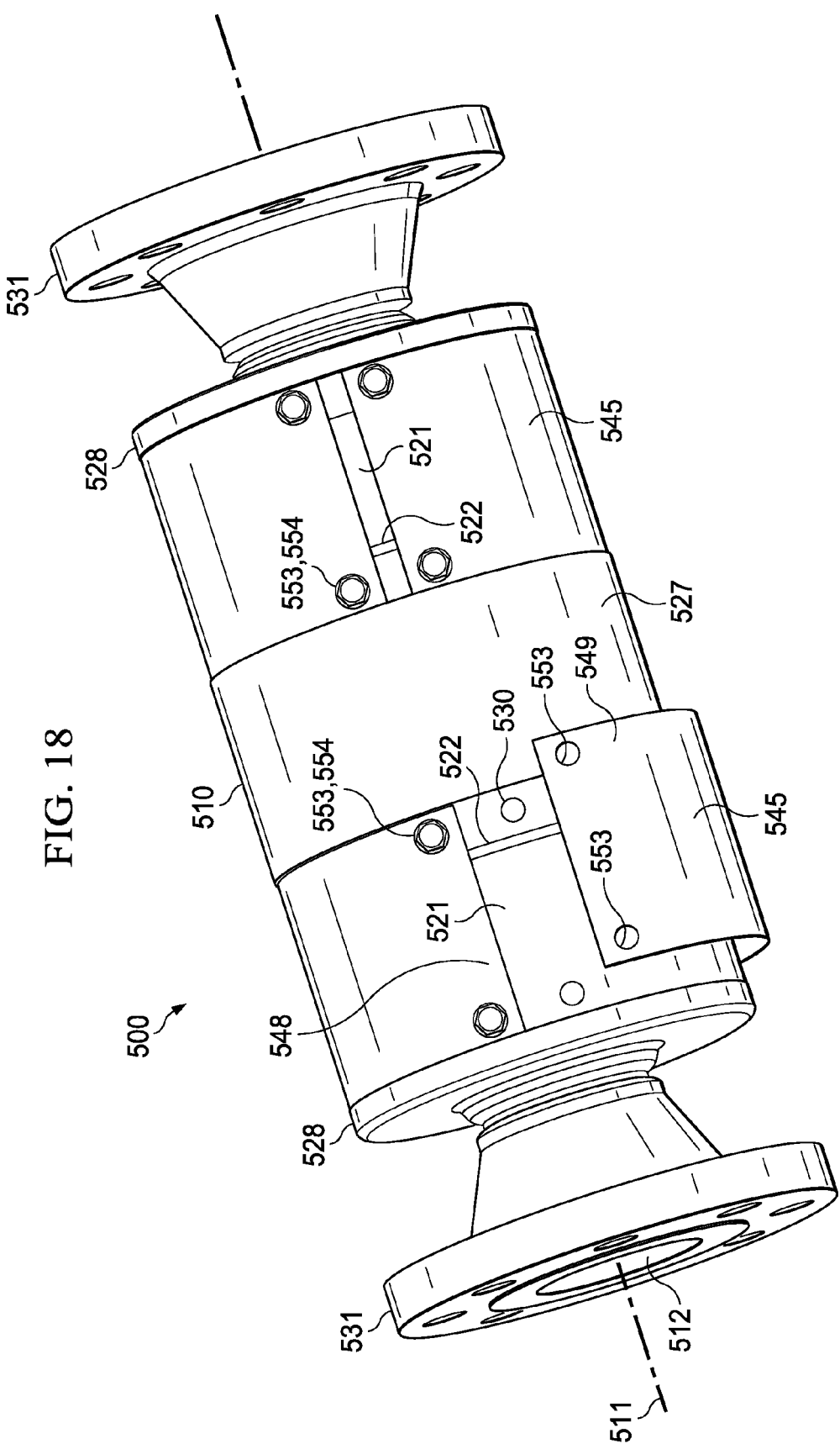
FIG. 18 is a bottom perspective view of the meter of FIG. 17.
Figure 19:
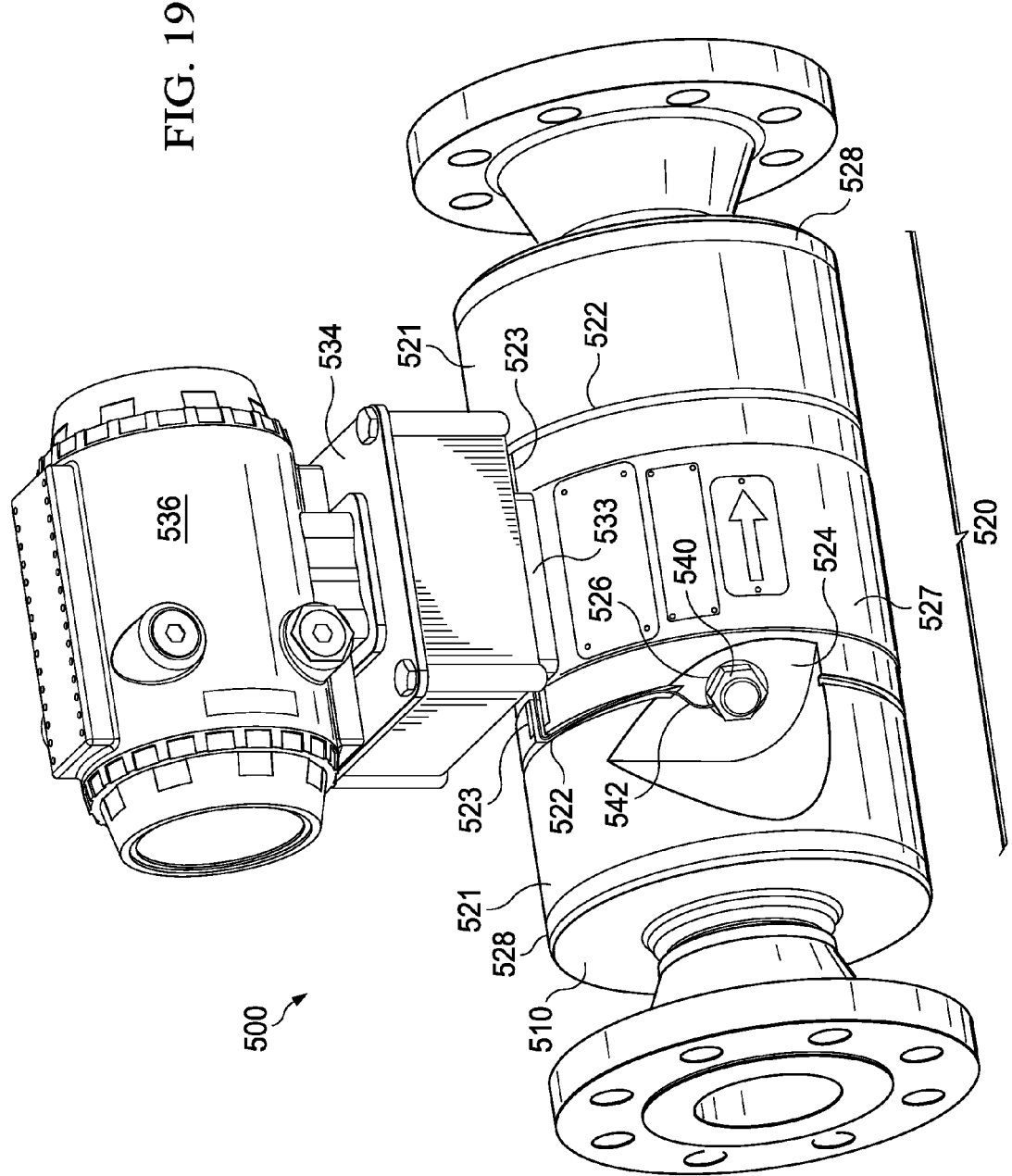
FIG. 19 is a perspective view of the meter of FIG. 17 shown without a banded shroud installed.

Referring now to FIGS. 18 and 19, meter body 510 includes a generally tubular section with a generally cylindrical outer surface 520 and a longitudinal axis 511, a central flow passage 512 through which the flow of a fluid may be measured. Typically, body 510 is cast or forged and then machined to its final form; however, it may be formed by any suitable manufacturing technique. Each end of meter body 510 is coupled to a flange 531. Flanges 531 are adapted for connection to corresponding flanges (not shown) on pipeline sections. As best shown in FIG. 19, in this embodiment, meter body 510 further comprises a raised annular lip 528 at each end, and two recesses 521 which are circumferential or nearly circumferential and that have a width that extends axially between an end-lip 528 and central portion 527. Outer surface 520 spans across center portion 527, the two recesses 521, and end-lips 528. In the embodiment shown, the two lips 528 at each end have the same outer diameter as central portion 527. Recesses 521 have a smaller outer diameter. A circumferential channel 522 is disposed within each circumferential recess 521. A longitudinally-directed channel 523 (FIG. 19) extends from each channel 522 into the central portion 527 and passes underneath the location where junction block 533 couples to meter body 510.

Referring still to FIG. 19, meter 500, further comprises at least one recess or transducer pocket 524 in circumferential recess 521. A transducer assembly 540 is disposed in pocket 524. In the disclosed embodiment, meter body 510 has two transducer pockets 524, each configured for the placement of a transducer 540 that, in the present example, is an ultrasonic transducer. The second pair of these features 524, 540 is on the opposite end and the opposite side of body 510 and is therefore not visible in FIG. 19. Each pocket 524 connects to a threaded port 526, extending to central flow passage 512. Each port 526 is configured to receive threadingly and to hold tightly a transducer assembly 540 without loss of fluid. When installed, some aspect of one or more of the transducer assemblies 540 may extend into central flow passage 512. Transducer 540 is electrically coupled to circuitry within an electronics housing 534, 536 by cable 542. The path of cable 542 will be explained in more detail subsequently. The circuits in an electronics housing 534, 536 may be configured to do any or all of these tasks: receive, amplify, adjust, and transmit data from one or more transducers 540. In at least one embodiment, multiple pairs of transducers 540 are disposed in multiple pockets 524 and ports 526.

Referring to FIG. 18, compliant band 545 includes a first end 548 and a second end 549. The ends 548, 549 include at least one aperture 553 to receive a threaded fastener 554 when a band 545 is installed within recess 521 formed on meter body 510. When securing a band 545 circumferentially on meter body 510, fasteners 554 threadingly engage threaded counter bores 530 formed in circumferential recess 521. Depending on the thickness of band 545, its outside surface may be flush with the outside surface of central portion 527. In the embodiment of FIG. 18, compliant band 545 is disposed about a majority of the circumference of meter body 510; although, other embodiments may have a shorter or longer band 545 that covers a lesser or greater portion of meter body 510. Furthermore, compliant band 545 covers at least one pocket 524, at least a portion of a circumferential channel 522, and at least a portion of a longitudinally-directed channel 523, such that interconnected chambers are formed between the inner surface of the band 545 and features 524, 522, 523 and can serve as wireways for transducer cables 542. When installed, the second compliant band 545 may be secured in a similar manner to form chambers in conjunction with at least a second pocket 524 and the second pair of channels 522, 523 toward the opposite end of meter body 510. In the embodiment of FIG. 18, the chambers formed by features 524, 522, 523 and one band 545 house one transducer 540 and one cable 542. In other embodiments these chambers may house more than a single transducer 540 and cable 542.

When assembled, a cable 542 coupled to a transducer 540 is disposed through the chambers incorporating a pocket 524, a circumferential channel 522, and a longitudinally-directed channel 523. Cable 542 then passes first under junction block 533 and then through a bore in block 533, finally passing through an aperture in lower electronics housing 534. Thus, junction block 533 is adapted to pass one or more cables 542 from within one or more chambers to a location outside shroud 545. When a cable passes from junction block 533 to, for example, electronics housing 534, the cable passes through aligned apertures in the coupled features 533, 534 similar to the embodiment discussed with reference to FIG. 5. Cable 542 may connect to a circuit board for data conditioning or manipulation within a housing 534, 536. Cable 542 may connect to a circuit board or a cable connector block in order for data to be transmitted to another location by wire or wirelessly. An example of the hole or through-bore in a block like block 533 is shown later as feature 637 in FIG. 22.

In at least one alternative embodiment to that shown in FIGS. 17-19, outer surface 520 may be formed without recess 521. Even in such alternative embodiment, meter body 510 includes two circumferential channels 522 and one or two longitudinally-directed channels 523 in generally similar positions as the channels 522, 523 in the embodiment of FIG. 19. Other features of this alterative embodiment may be similar to those shown in FIGS. 17 to 19 with appropriate adjustments for the shape of outer surface 520. For example, the compliant bands 545 may be longer, or the position of threaded counter bores 530 may be adjusted. In this alternative embodiment thus described, the outside surface of bands 545 would not be flush with the outside diameter of central portion 527.

A Fourth Embodiment of a Meter Having Banded Shroud

Figure 20:
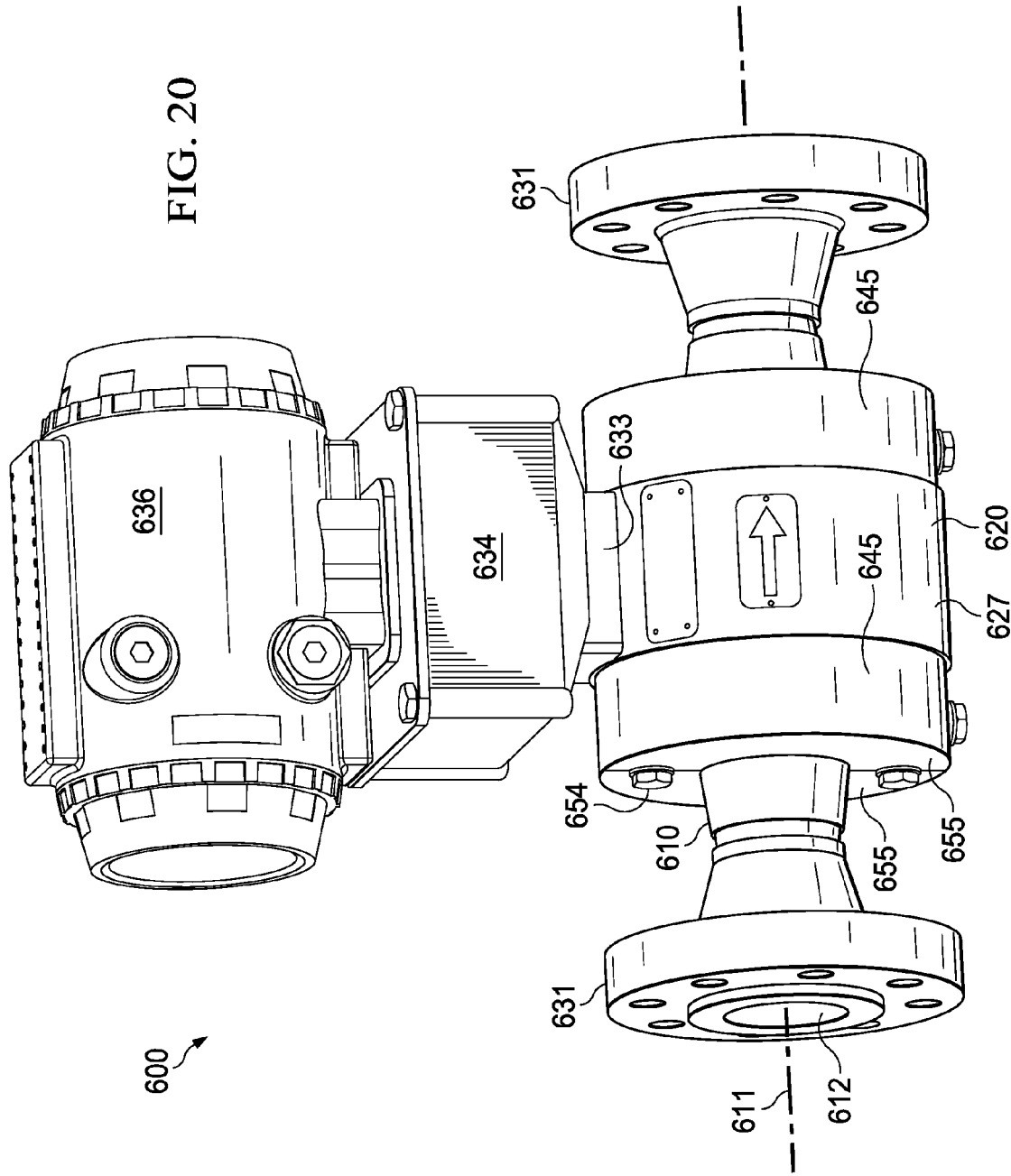
FIG. 20 is a perspective view showing a fourth embodiment of a meter with a banded shroud in accordance with principles described herein.
Figure 21:
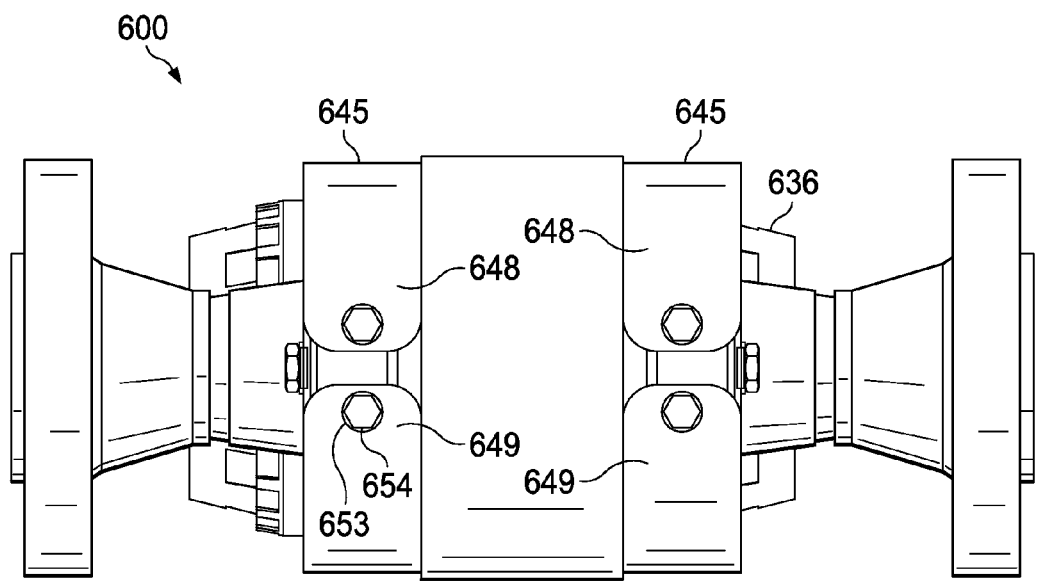
FIG. 21 is a bottom view of the meter of FIG. 20.
Figure 22:
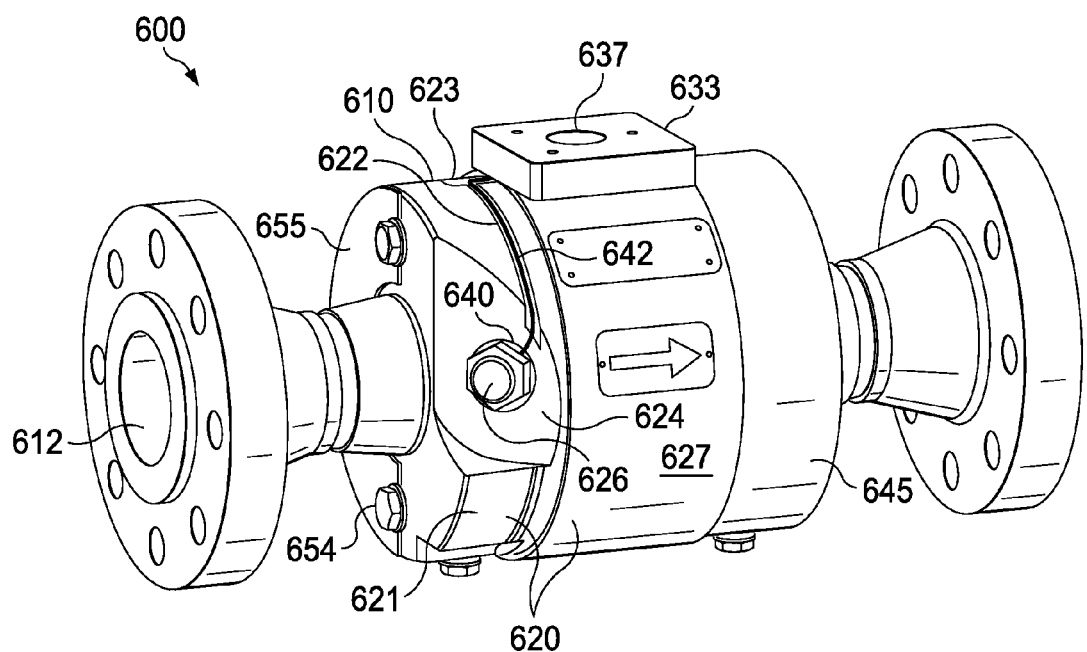
FIG. 22 is a perspective view of the meter of FIG. 20 shown with only one of two banded shrouds installed.

Another flow meter embodiment 600 consistent with the present disclosure is presented in FIGS. 20, 21, and 22. The meter body or spool piece 610 of flow meter 600 comprises a structure similar to the previous, meter body 510 discussed in reference to FIGS. 17 to 19, yet body 610 has no end-lips like end lips 528 (FIG. 18). Instead circumferential recesses 621 of meter 600 extend to the outer ends of meter body 610.

Flow meter 600 also comprises one or more compliant bands 645 configured to couple around meter body 610, one or more transducer assemblies 640 (FIG. 22), a pair of flanges 631, a junction block 633, and one or more electronics housings. In the embodiment of FIGS. 20 and 22, two compliant bands 645 are disposed around meter body 610, and a lower electronics housing 634 and an upper electronics housing 636 are coupled to meter body 610 by junction block 633.

Referring now to FIGS. 20 and 22, meter body 610 includes a generally tubular section with a generally cylindrical outer surface 620 and a longitudinal axis 611, a central flow passage 612 through which the flow of a fluid may be measured. Typically, body 610 is cast or forged and then machined to its final form; however, it may be formed by any suitable manufacturing technique. Each end of meter body 610 is coupled to a flange 631. Flanges 631 are adapted for connection to corresponding flanges (not shown) on pipeline sections. As best shown in FIG. 22 for the disclosed embodiment, meter body 610 further comprises a central portion 627 and two recesses 621. Each recess 621 is circumferential or nearly circumferential and extends axially from central portion 627 to one of the two ends of body 610. Outer surface 620 spans across central portion 627 and the two recesses 621. A circumferential channel 622 is disposed adjacent outer surface 620 within each circumferential groove 621. A longitudinally-directed channel 623 extends from each channel 622 into the central portion 627 and passes underneath the location where junction block 633 couples to meter body 610.

Referring still to FIG. 22, meter 600 further comprises at least one recess or transducer pocket 624 in circumferential recess 621. A transducer assembly 640 is disposed in pocket 624. In the disclosed embodiment, meter body 610 has two transducer pockets 624, each configured for the placement of a transducer 640 that, in the present example, is an ultrasonic transducer. The second pair of these features 624, 640 is on the opposite end and may be on the opposite side of body 610. The second pair of these features 624, 640 is hidden under a compliant band 645 in FIG. 22 and therefore not visible. Each pocket 624 connects to a threaded port 626 (under transducer 640), extending to central flow passage 612. Each port 626 is configured to receive threadingly and to hold tightly a transducer assembly 640 without loss of fluid. When installed, some aspect of one or more of the transducer assemblies 640 may extend into central flow passage 612. Transducer 640 is electrically coupled to circuitry within an electronics housing 634, 636 by a cable 642. The path of cable 642 will be explained in more detail subsequently. The one or more circuits in an electronics housing 634, 636 may be configured to do any or all of these tasks: receive, amplify, adjust, and transmit data from one or more transducers 640. In at least one embodiment, multiple pairs of transducers 640 are disposed in multiple pockets 624 and ports 626.

Referring to FIG. 21, compliant band 645 includes a first end 648 and a second end 649. The ends 648, 649 include at least one aperture 653 (under fastener 654) to receive a threaded fastener 654 when a band 645 is installed within recess 621 on meter body 610. When securing a band 645 circumferentially on meter body 610, fasteners 654 threadingly engage threaded counter bores (not shown) in surface 620. In the embodiment shown in FIG. 21, compliant band 645 is disposed about a majority of the circumference of meter body 210; although, other embodiments may have a shorter or longer band 645 that covers a lesser or greater portion of meter body 610. Depending on the thickness of band 645, its outside surface may be flush with the outside surface of central portion 627. As best seen in FIG. 20, at each end of meter body 610, two half-annular end plates 655 are coupled perpendicular to axis 611. The pair of end plates 655 is held by additional threaded fasteners 654 threadingly received in counter bores (not shown) on body 610. Band 645 extends axially at least to an end of body 610 and may extend to or beyond end plates 655. Given this arrangement, each end plate 655 may be installed or removed independently from the other.

For the embodiment of FIG. 22, compliant band 645 covers at least one pocket 624, at least a portion of a circumferential channel 622, and at least a portion of a longitudinally-directed channel 623, such that interconnected chambers are formed between the inner surface of the band 645 and features 624, 622, 623 and serve on wireways for transducer cables 642. When installed, the second compliant band 645 is secured in a similar manner to form chambers in conjunction with at least a second pocket 624 and the second pair of channels 622, 623 toward the opposite end of meter body 610. In the embodiment of FIG. 22, the chambers formed by features 624, 622, 623 and one band 645 house one transducer 640 and one cable 642. In other embodiments, these chambers may house more features 640, 642 therein.

When assembled, a cable 642 coupled to a transducer 640 is disposed through the chambers incorporating a pocket 624, a circumferential channel 622, and a longitudinally-directed channel 623. Cable 642 then passes first under junction block 633 and then through a bore 637 in block 633, finally passing through an aperture in into lower electronics housing 634. Thus, junction block 633 is adapted to pass one or more cables 642 from within one or more chambers to a location outside shroud 645. For a cable passing from junction block 633 to electronics housing 634, the cable passes through aligned apertures in the coupled features 633, 634, similar to the example of FIG. 5. Cable 642 may connect to a circuit board for data conditioning or manipulation within an electronics housing 634, 636. Cable 642 may connect to a circuit board or a cable connector block in order for data to be transmitted to another location by wire or wirelessly.

In at least one alternative embodiment to that shown in FIG. 22, outer surface 620 has no recess 621. Even in such alternative embodiment, meter body 610 includes two circumferential channels 622, and one or two longitudinally-directed channels 623 in generally similar positions as the channels 622, 623 in the embodiment of FIG. 22. Other features of this alterative embodiment may be similar to those shown in FIGS. 20 to 22 with appropriate adjustments for the more uniform shape of outer surface 620. For example, the compliant bands 645 may be longer, or the position of threaded counter bores 630 may be adjusted. In this alternative embodiment thus described, the outside surface of bands 645 would not be flush with the outside diameter of central portion 627.

Additional Information

Exemplary embodiments consistent with the present disclosure have been presented, each with at least one shroud formed with at least one band. Examples have included compliant bands 18, 345, 545, 645. In addition to, or instead of, covering one or more transducers 29, 540, 640 coupled to one or more cables 25, 542, 642, these shrouds and bands may cover other transducers that may transmit wirelessly and therefore may not be connected to a cable. Alternatively, one or more transducers may be coupled to wirelessly-transmitting or wirelessly-receiving circuitry also protected by a shroud or protected by an enclosure, such as an electronics housing.

Within any embodiments consistent with this disclosure, the junctions between various components may be mechanically configured to inhibit or reduce the intrusion of moisture. For example, in some embodiments, the junctions between various external components may be sealed against passage of moisture or air by the use of a sealant such as a rubber gasket, silicone seal, caulking, or another suitable, resilient or compliant material. As an example, referring to FIG. 8, junctions that may be so configured or sealed include the junction between compliant band 345 and end supports 255, the junction between compliant band 345 and central shroud 375, and the junction between central shroud 375 and conduit 233, which occurs at semi-circular notches 388. The conduit 233, 234 and electronics housings 236 and the junctions between these features are preferably sealed. Other junctions that may be sealed include junctions coupled by threaded fasteners such as the junction between end supports 255 and radially-extending annular surfaces 214, for example. Additional examples of sealing members were disclosed with reference to FIG. 5 earlier in the text.

Some modifications to meter body 10, 210, 510, 610, or to compliant band 18, 345, 545, 645 may be necessary to accommodate the one or more other components. Changes may include, for example, altering the size or orientation of transducer pocket 224 or threaded port 226, or, for example, a compliant band 18, 345, 545 may include a bulge (not shown) to accommodate a transducer 29, 540, 640 that extends beyond the outer diameter of the meter body 10, 210, 510, 610.

While disclosed embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. Accordingly, the scope of protection is not limited to the embodiments described herein, but is only limited by the claims that follow, the scope of which shall include all equivalents of the subject matter of the claims.

What is claimed is:

1. A flow meter, comprising:
a meter body having a longitudinal axis, a curved outer surface, and a curved channel in said outer surface, and a pocket disposed in said outer surface; and
a shroud disposed about at least a portion of said meter body and comprising at least one compliant band of sheet material covering said channel, said band extending circumferentially about a majority of said meter body and having two ends and an inner surface that engages said outer surface of said meter body along the length of said band;
wherein said channel and said band form a chamber between said band and said meter body; and
said shroud further comprising a central shroud component coupled to said meter body, adjacent said two ends of said band, and adapted to receive a cable disposed within said chamber and to pass said cable to a location outside said shroud; a transducer assembly disposed in said pocket and coupled to said meter body; and a cable coupled to said transducer and extending from said transducer assembly through said chamber and into said central shroud component; wherein said compliant band covers said pocket and said transducer assembly.

2. The flow meter of claim 1 further comprising an enclosure adapted for housing electronics, wherein said cable extends from said central shroud component and into said enclosure.

3. The flow meter of claim 1 wherein said meter body comprises an annular recess disposed in said outer surface and extending around a majority of the circumference of said meter body;
wherein said curved channel is disposed in said recess; and
wherein said band is disposed in said recess.

4. The flow meter of claim 1 wherein said shroud comprises at least two bands axially spaced from one another.

5. The flow meter of claim 1 wherein said meter body comprises a protrusion extending from said outer surface and into a hole in said band adjacent one of said ends; and
wherein said protrusion and said hole are configured to retain the band on said meter body.

6. The flow meter of claim 1 further comprising one or more fasteners releasably coupling said band to said meter body; and
wherein each fastener engages each end of said band.

7. The flow meter of claim 1 further comprising: a longitudinally extending channel in said outer surface; and an end shroud component covering said longitudinally extending channel; and
wherein said longitudinally extending channel intersects said curved channel.

8. The flow meter of claim 7 further comprising a wireway extending from said curved channel to said central shroud component and through said end shroud component; and wherein the curved channel extends circumferentially about the meter body.

9. The flow meter of claim 1 wherein said first end of said band is spaced apart from said second end of said band by a gap, and wherein a fastener extends across said gap and releasably attaches to said first and second ends of said band.

10. The flow meter of claim 1 wherein said at least one band comprises two parts with each part having an interlocking end configured to couple or decouple, selectively, with said interlocking end of said other part; and
wherein the interlocking ends are spaced apart from the first and second ends.

11. A flow meter, comprising:
a meter body having a pair of flanges and a curved outer surface extending circumferentially about a majority of said meter body and extending longitudinally between said flanges, wherein said curved outer surface comprises a pocket
a plurality of axially spaced walls coupled to and extending radially away from said outer surface of said meter body and spaced apart from said flanges, wherein each wall extends about a majority of the circumference of said meter body;
a cover comprising a compliant band with an inner surface facing said outer surface of said meter body and engaging said walls;
a transducer assembly disposed in the pocket of said outer surface of the meter body and
coupled to said meter body; and
a cable coupled to said transducer assembly
wherein said band is disposed about a majority of the circumference of said outer surface and the majority of the circumference of said meter body and is supported by said walls along a majority of the length of said band;
wherein at least one chamber is formed between said band and said meter body; a central shroud component to said meter body and adapted to receive the cable disposed within said chamber and to pass said cable to a location outside said central shroud component;
wherein said cable extends from said transducer assembly through said at least one chamber; and wherein said band covers said pocket and said transducer assembly.

12. The flow meter of claim 11 wherein said walls have a non-uniform height as measured radially from said outer surface.

13. The flow meter of claim 12 further comprising a junction block coupled to said meter body and adapted to pass cables from within said at least one chamber to a location outside said at least one chamber;
wherein said at least one chamber extends along the majority of the circumference of said meter body.

14. The flow meter of claim 13 wherein said compliant band comprises a first end and a second end and wherein said band is coupled to said meter body such that said first and second band ends oppose one another across a gap that extends across a minority of the circumference of said meter body; and wherein said walls have their smallest height adjacent said junction block.

15. The flow meter of claim 14 further comprising at least one stand-off element disposed between said junction block and said meter body forming a second chamber there between.

16. The flow meter of claim 13 wherein said band comprises a first end and a second end opposite said first end;

wherein said ends of said band are disposed near said junction block; and wherein said first end of said band is releasably attached to said second end of said band.

17. The flow meter of claim 11 wherein said band comprises two parts, each of said band parts having a first end and an interlocking end that is spaced apart from said first end, wherein said first ends of each part oppose one another across a gap, and wherein said interlocking end of each part is configured to couple or decouple, selectively, with said interlocking end of said other part.

18. A flow meter, comprising:
a meter body having a through bore for conducting fluid there through and having a curved outer surface;
a shroud assembly comprising at least one compliant band extending around a majority of the circumference of said outer surface and a majority of said meter body, said band having two ends and an inner surface that engages said outer surface of said meter body along said band's length, wherein said band is coupled to said meter body such that said two ends oppose one another across a gap;
a chamber between said band and said meter body;
an ultrasonic transducer disposed within said chamber and disposed in a pocket within said meter body; and
a cable in said chamber and extending from said transducer and through said gap; a central shroud component coupled to said meter body and adapted to receive the cable disposed within said chamber and to pass said cable to a location outside said central shroud component; and wherein said band covers said pocket and said ultrasonic transducer.

19. The flow meter of claim 18 further comprising at least one fastener extending across said gap and releasably coupling said first end of said band to said second end of said band.

20. The flow meter of claim 18 further comprising a junction block coupled to said meter body and adapted to pass cables from within said chamber to a location outside said shroud assembly.

21. The flow meter of claim 20 further comprising: an enclosure coupled to said meter body and adapted for housing electronics; and
wherein said junction block is disposed between said enclosure and said meter body.

22. The flow meter of claim 21 further comprising a transducer cable extending from said transducer into said enclosure, said cable being disposed through said chamber and through aligned apertures formed in said enclosure and said junction block.

23. The flow meter of claim 18 wherein said flow meter further comprises a curved channel formed in said outer surface of said meter body and within said chamber, and wherein said cable is disposed in said channel.

24. The flow meter of claim 18 further comprising at least one adjustable fastener coupling said first end of said band to said second end of said band.

25. The flow meter of claim 18 wherein said shroud assembly comprises at least two bands axially-spaced from one another on said meter body.

26. The flow meter of claim 18 wherein said band is a unitary band of sheet metal.

27. A method of making a flow meter, comprising:
providing a meter body having an outer surface;
providing a first compliant shroud band having first and second ends and an inner surface;
positioning said first compliant shroud band circumferentially around a majority of said meter body with said inner surface of said band engaging said outer surface of said meter body; disposing the ultrasonic transducer in a pocket disposed in the outer surface of the meter body;

coupling an ultrasonic transducer to said meter body;

coupling a cable to said transducer;

enclosing said cable in a curved wireway formed between said inner surface of said shroud band and said outer surface of said meter body, the wireway following the curvature of said outer surface; and coupling a central shroud component to said meter body, whereby the central shroud component receives said cable and passes said cable to a location outside the central shroud component; covering said pocket and said transducer with said shroud band; and affixing said first and second ends of said shroud band to said outer surface of said meter body such that first and second ends are spaced apart across a gap.

\* \* \* \* \*